INVENTOR
BILLY D. ABLES

ATTORNEY

Nov. 10, 1970          B. D. ABLES          3,539,256

STEP AND REPEAT CAMERA WITH COMPUTER CONTROLLED FILM TABLE

Filed Oct. 18, 1967          16 Sheets-Sheet 2

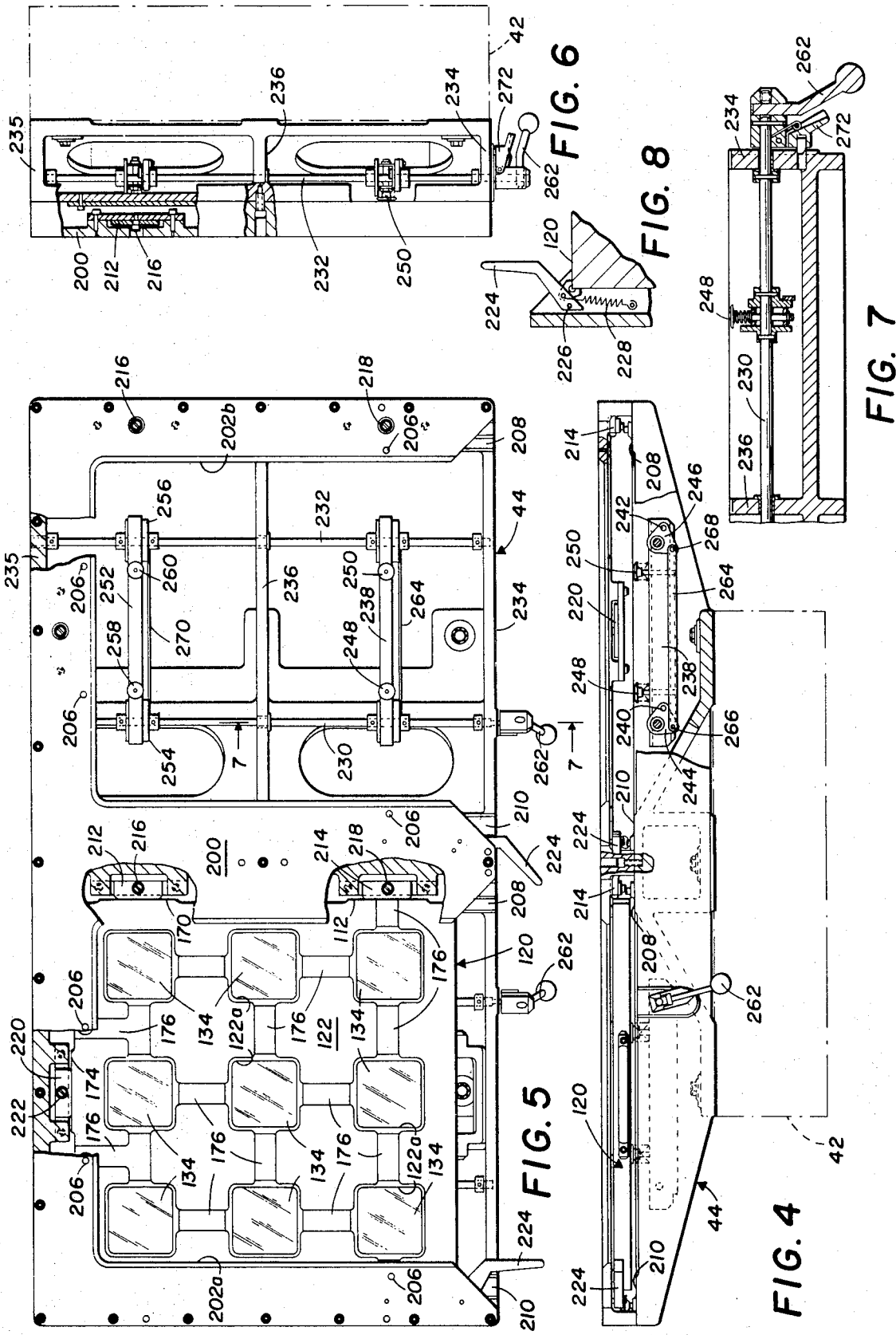

Nov. 10, 1970   B. D. ABLES   3,539,256
STEP AND REPEAT CAMERA WITH COMPUTER CONTROLLED FILM TABLE
Filed Oct. 18, 1967   16 Sheets-Sheet 5

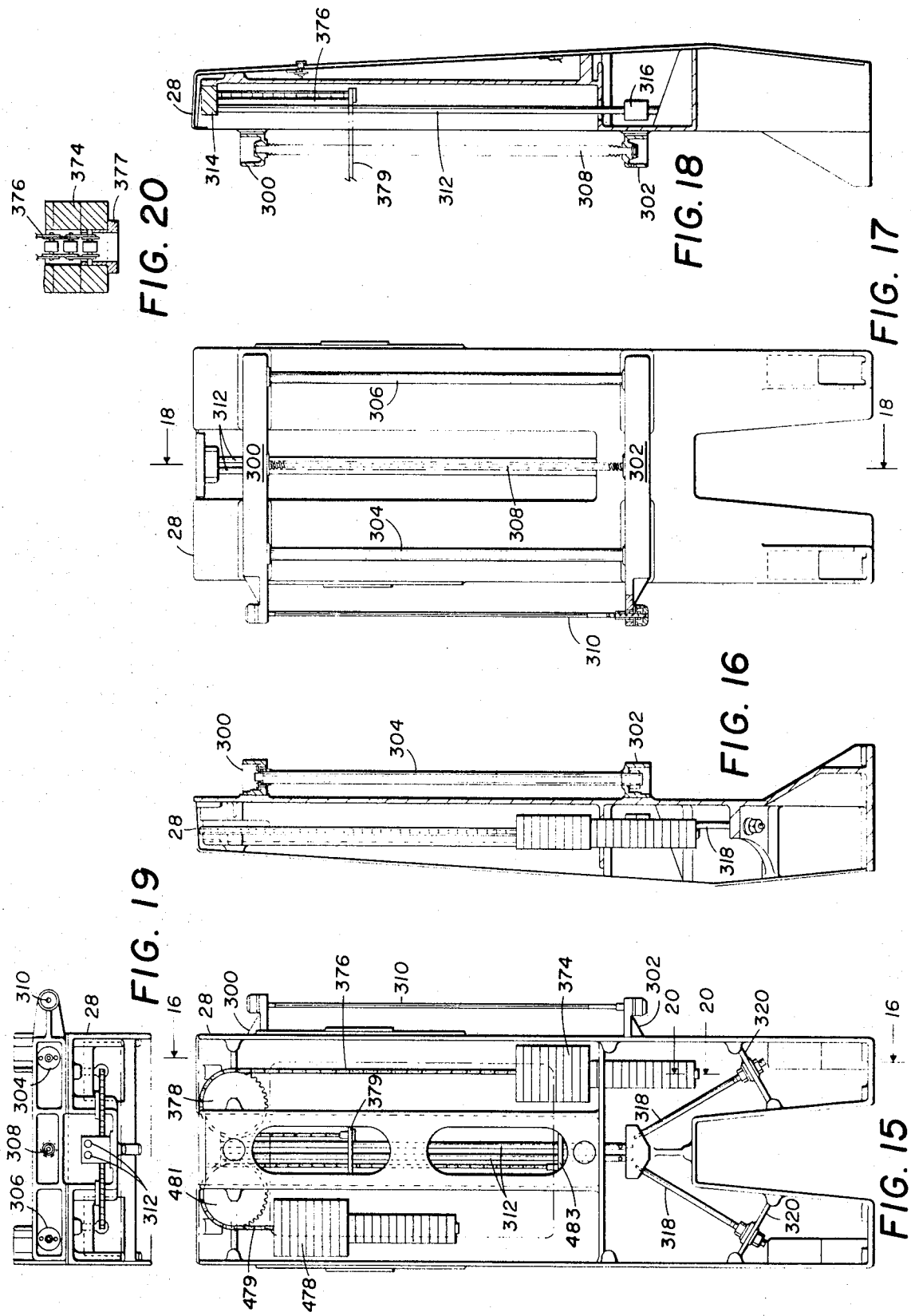

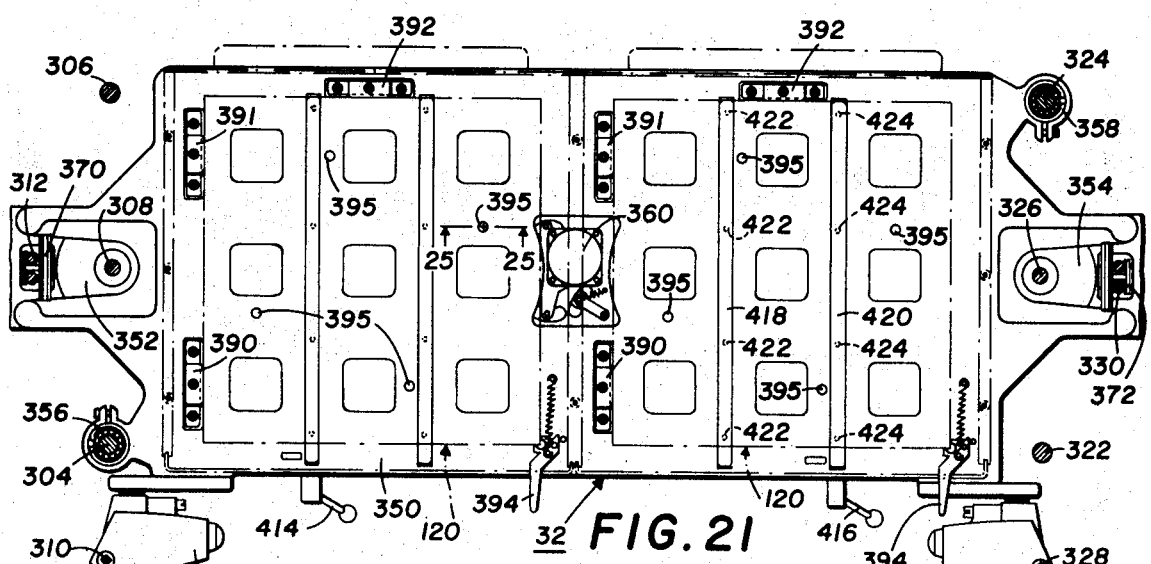
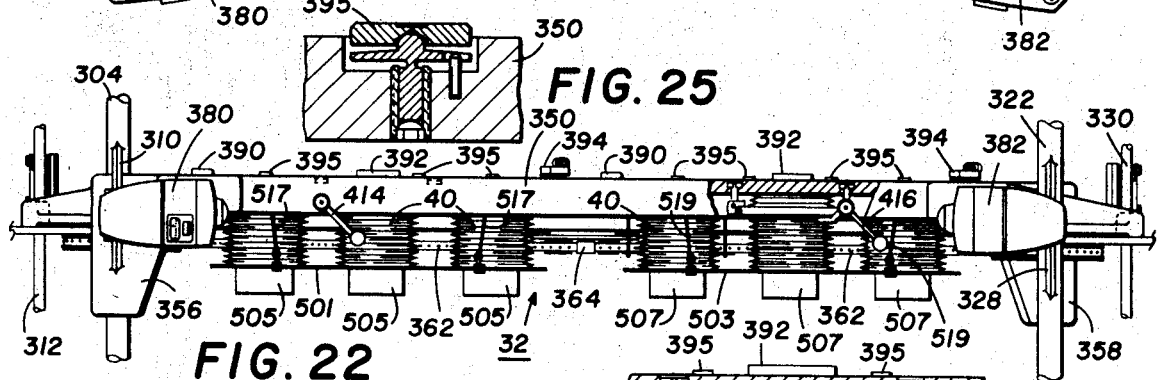
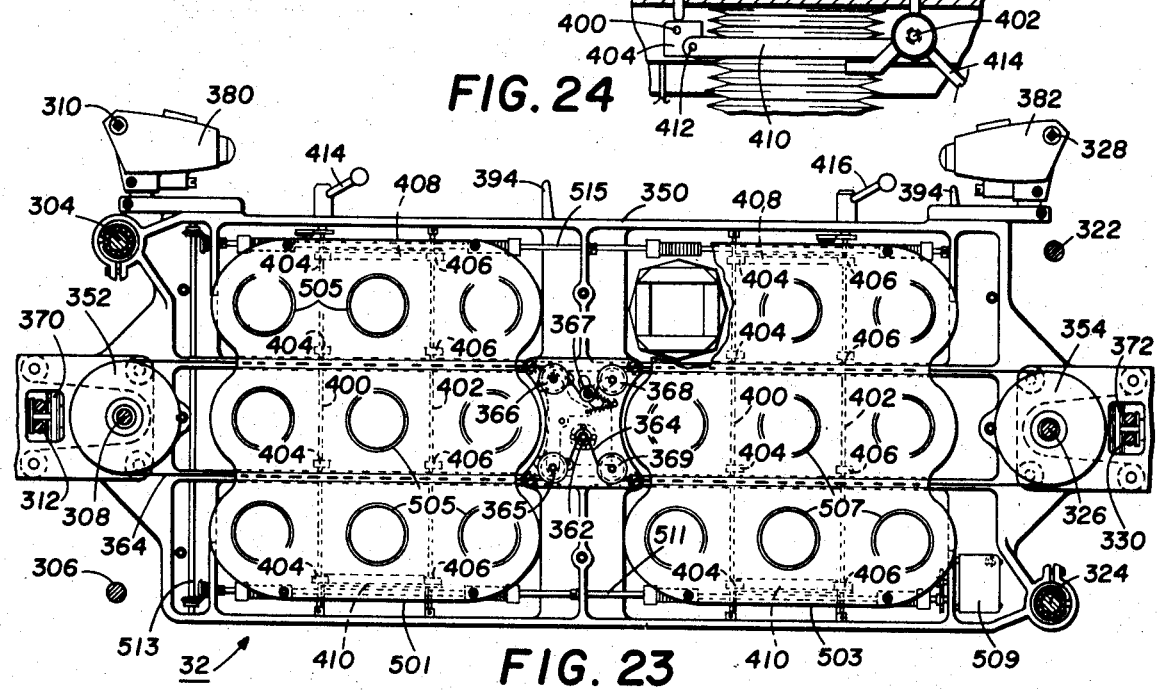

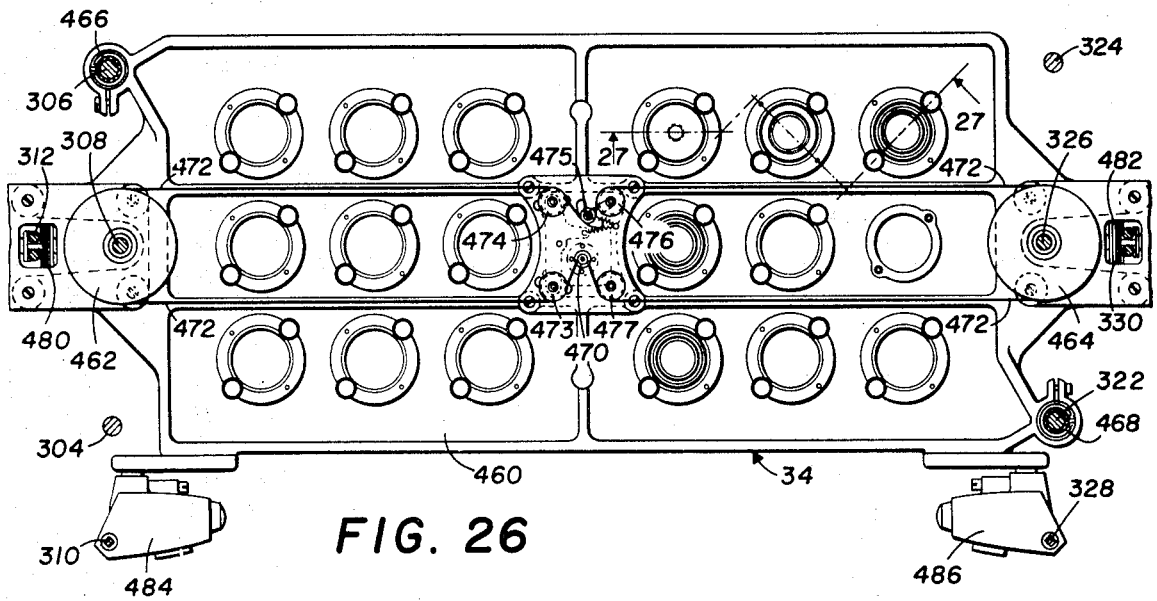
FIG. 26
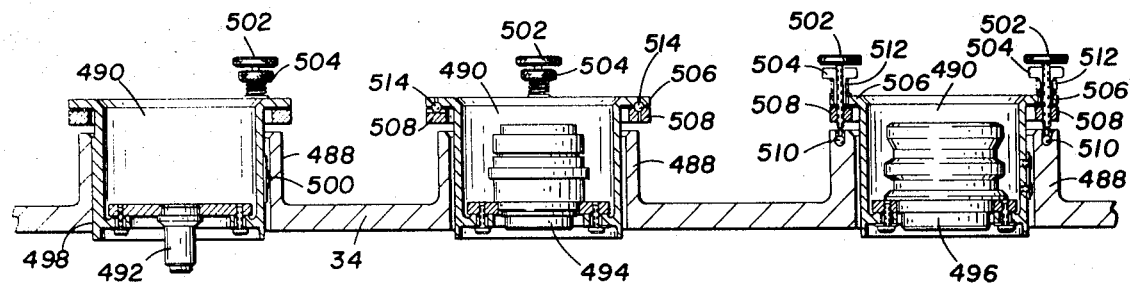
FIG. 27
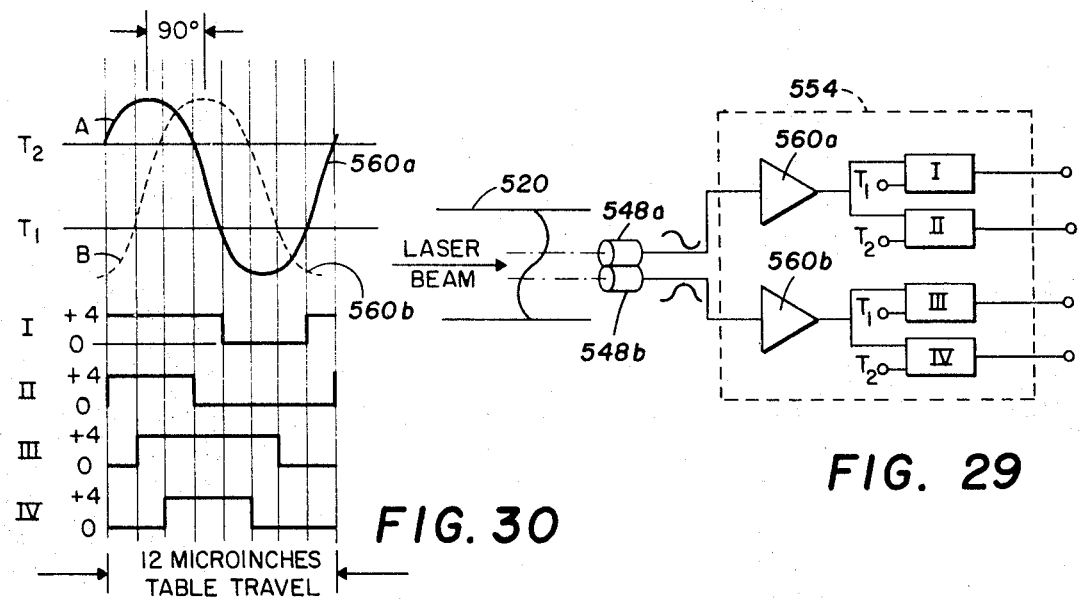
FIG. 30
FIG. 29

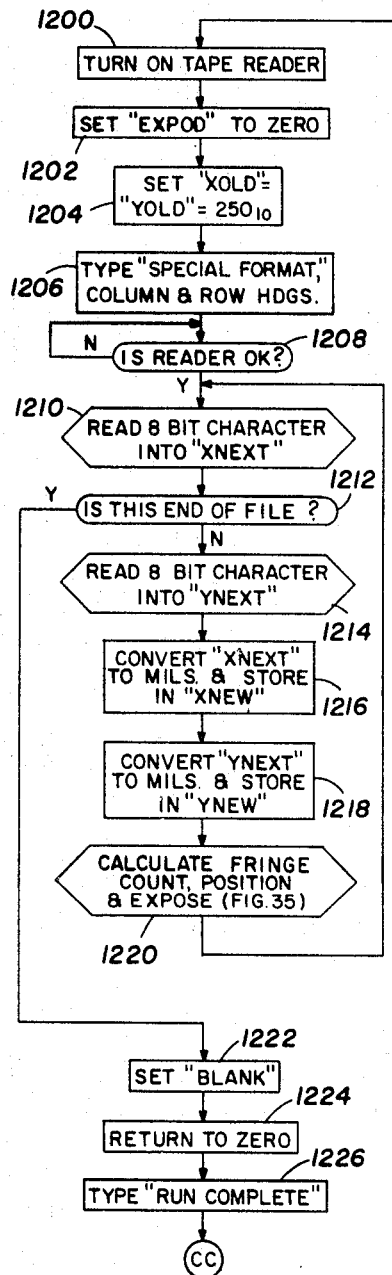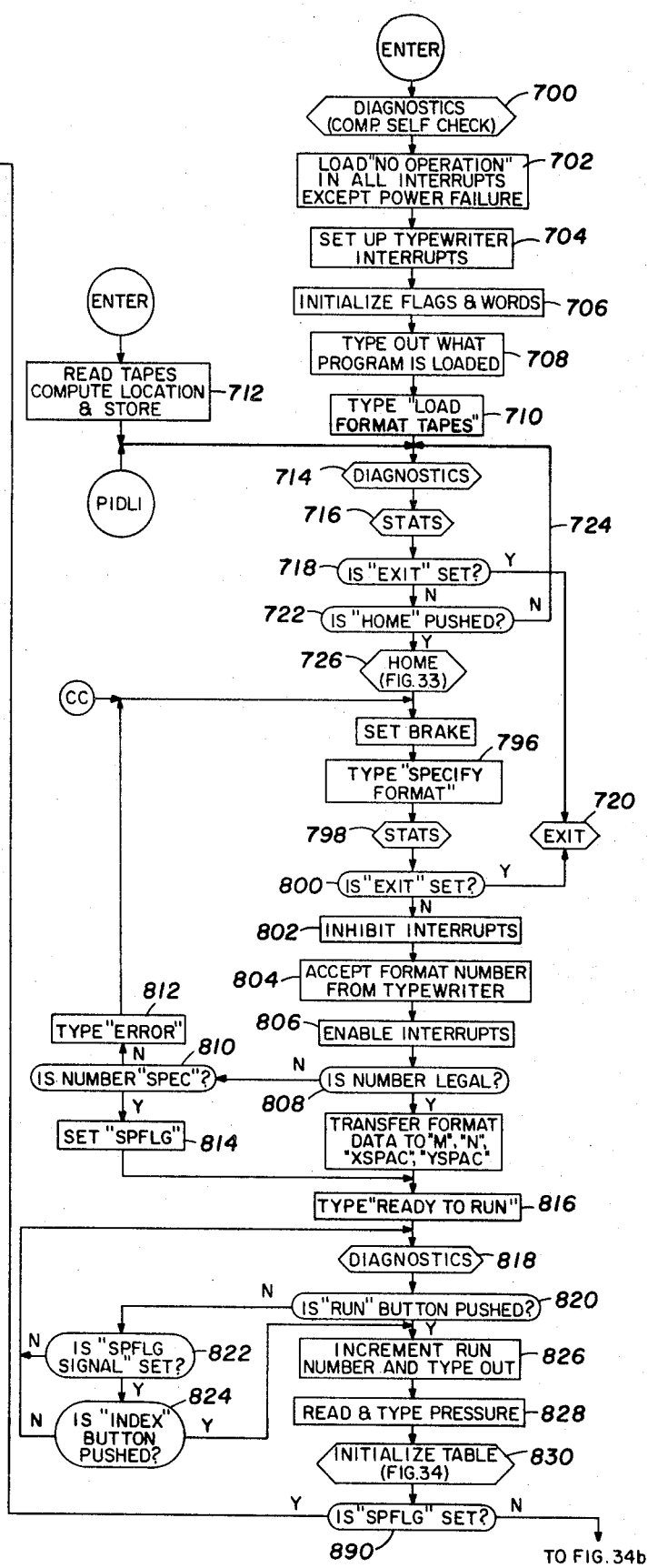
FIG. 32a

Nov. 10, 1970     B. D. ABLES     3,539,256
STEP AND REPEAT CAMERA WITH COMPUTER CONTROLLED FILM TABLE
Filed Oct. 18, 1967     16 Sheets-Sheet 14
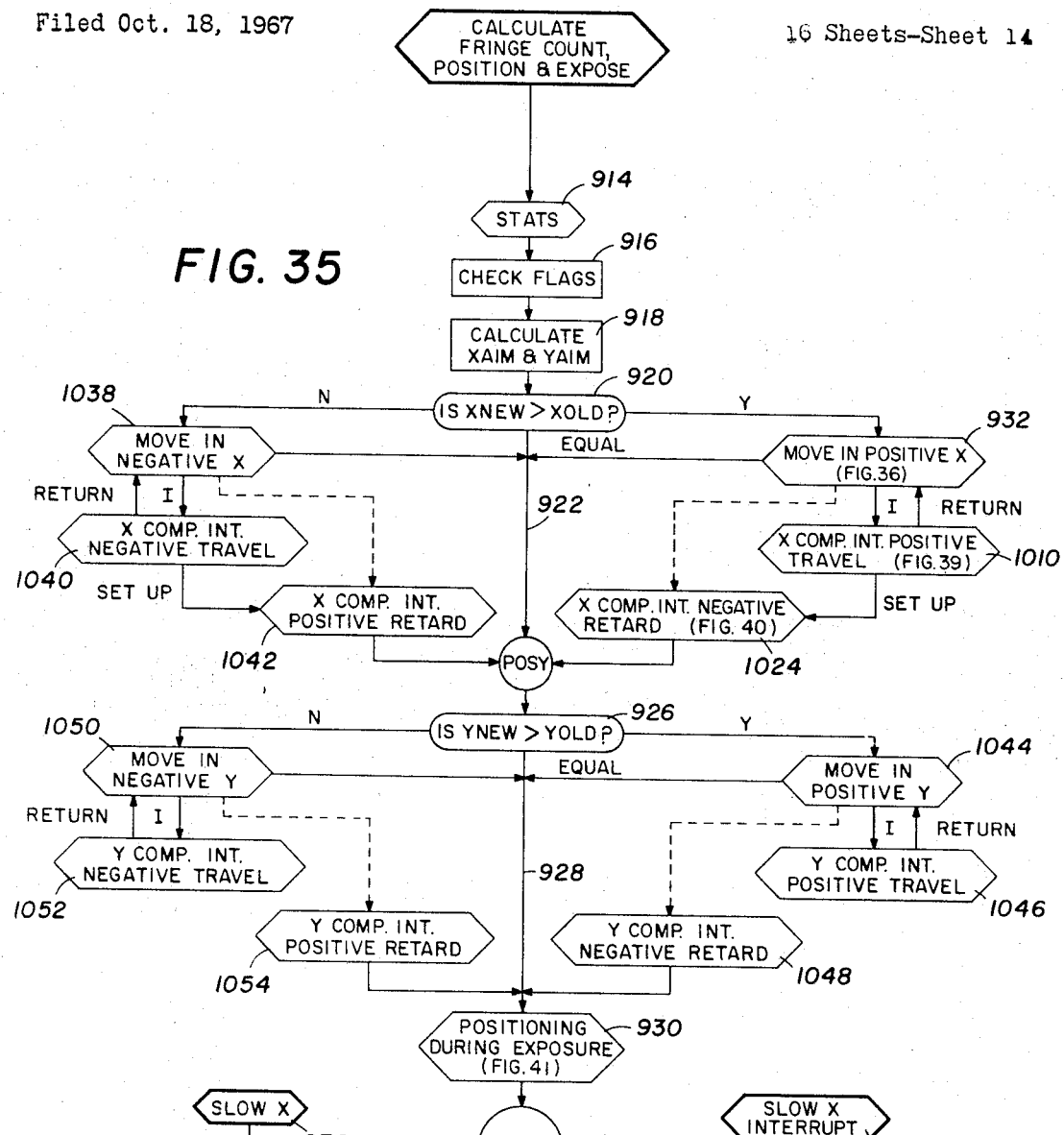
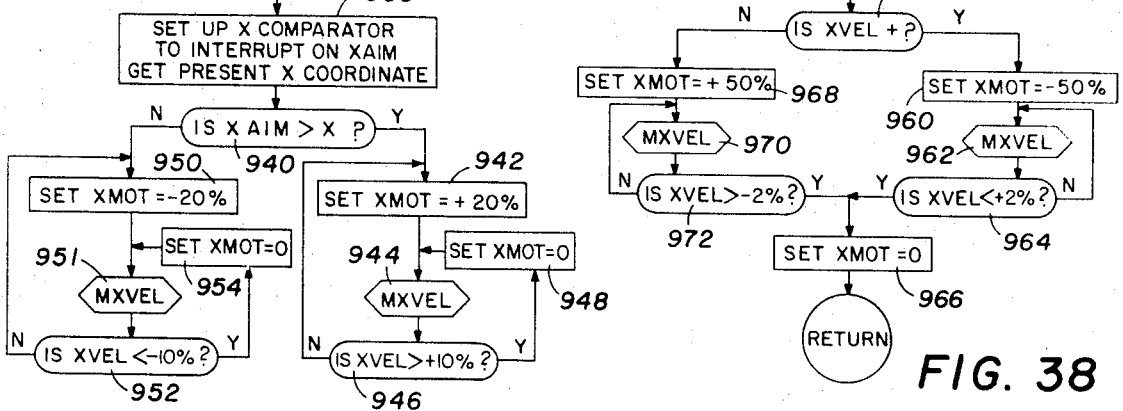

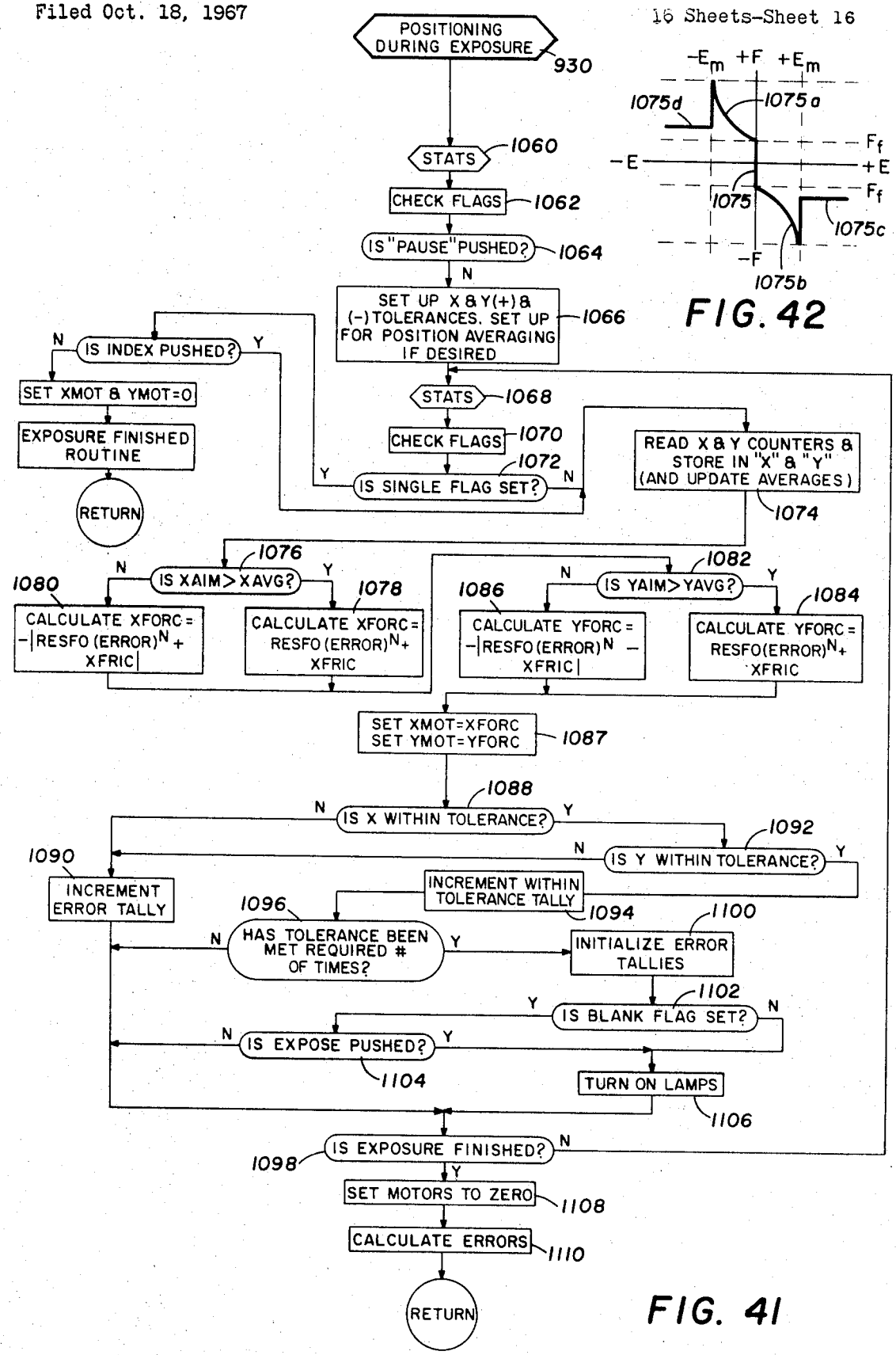
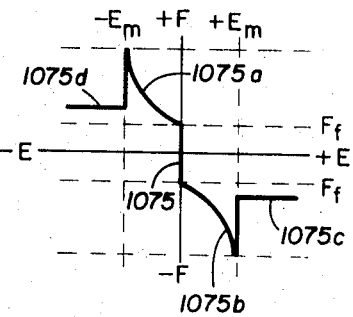
FIG. 42
FIG. 41

3,539,256
STEP AND REPEAT CAMERA WITH COMPUTER CONTROLLED FILM TABLE
Billy D. Ables, Richardson, Tex., assignor to Texas Instruments Incorporated, Dallas, Tex., a corporation of Delaware
Filed Oct. 18, 1967, Ser. No. 676,100
Int. Cl. G03b 27/06
U.S. Cl. 355—53
9 Claims

ABSTRACT OF THE DISCLOSURE

A film support table is supported by air bearings and is movable in the X and Y coordinate directions by X and Y drive systems utilizing precision X and Y guide rails and an air bearing keeper system. A laser interferometer and fringe counter detects movement of the table in the X and Y coordinate directions by fringe counts. A projection system simultaneously projects a plurality of images onto the film carried by the table after the table is moved to each of a plurality of predetermined exposure positions. A reference detector system detects when the table is at a zero reference position and resets the counters. A digital computer is programmed to compute the coordinate of each exposure position and then, based on the current barometric pressure, compute the X and Y coordinates, in fringe counts from the reference positioning of the first exposure position. The computer then operates the drive ssytem in such a manner as to move the table to the exposure position by continuously computing the position and velocity of the table from the readings of the fringe counters. Then the table is maintained at the exposure position during the exposure period by continuously determining the position of the table from the fringe counters and operating the drive system to produce forces for correcting the positional error.

---

This invention relates generally to step and repeat cameras, and more particularly, but not by way of limitation, relates to such a camera for producing a set of photolithographic masks for fabricating large arrays of semiconductor devices.

A semiconductor device, such as a transistor, is usually fabricated by a series of diffusion steps. Each diffusion step involves applying a coat of photosensitive polymer, known as photo-resist, over a silicon dioxide layer on the surface of the semiconductor substrate. A photomask is pressed against the surface of the photo-resist and the photo-resist exposed to light. When the photo-resist is photographically developed, selected areas of the photo-resist are removed to expose the underlying silicon dioxide. The exposed silicon dioxide is then removed by an etching fluid which does not attack the photo-resist to expose the underlying semiconductor material. The photo-resist is then stripped from the silicon dioxide and impurities diffused into the areas of the semiconductor material exposed by the openings in the silicon dioxide layer. A new silicon dioxide layer is either grown over the exposed portion of the semiconductor material during the diffusion process, or is subsequently deposited, and the procedure repeated for the next diffusion step.

Each successive diffusion is typically made either into only a portion of a previous diffusion, or into a different area of the semiconductor slice so that a different photomask is required for each diffusion step. Each photomask is typically a square of flat glass with a photographically fixed high resolution emulsion on one face which has opaque and transparent areas. Since the face of the photomask carrying the fixed emulsion is pressed directly against the slice, the patterns on the photomask must be actual size, which may involve geometries from as large as tenths of inches to as small as tens of micro inches, although line widths on the order of forty micro inches are generally considered to be the ultimate limit when using silicon dioxide as the masking layer.

Semiconductor material is more easily grown, handled and processed as disk-shaped slices having a nominal diameter of about 1.5 inches and a thickness of about ten milli inches. For this reason, a large number of semiconductor devices are typically fabricated simultaneously on each slice by the same process steps. It is also common practice to fabricate semiconductors, diodes, resistors, and capacitors for a complete circuit on the same semiconductor substrate, and then interconnect the components by leads patterned from a metal film deposited on the surface of a silicon dioxide layer by the same photolithographic process. Openings are provided in the oxide layer where the metal leads must make contact with the individual active components. The fabrication of integrated circuits usually requires a larger number of diffusion steps, and thus a larger number of photomasks for the diffusion steps, and in addition requires an extra photomask to pattern the metal film to form the interconnecting leads. It is also common practice to simultaneously fabricate a large number of integrated circuits on each individual slice of semiconductor material by the same process steps.

It is impractical, if not impossible, to produce a photomask for a large array of either discrete devices or integrated circuits by drawing the entire mask on an enlarged scale and then photographically reducing the entire mask. However, the basic portion of each mask relating to a particular device, group of devices, or an integrated circuit can be originated on a much larger scale, and then optically reduced to a light image of actual size. Then the light image can be stepped over a photographic plate to produce the complete photomask. However, it is vitally important that the light image be precisely located at each successive exposure position with great precision. Otherwise, the successive photomasks will not completely register and the yield will be low.

One method for overcoming this problem involves producing all photomasks of a set simultaneously in a multi-barreled step and repeat camera. Then the same positional errors will occur in all masks of the set and the masks will perfectly register. However, this is not practical. Each photomask is good for only a limited number of exposures, for example from twenty to forty. Since a relatively large number of the slices prove defective at an early stage of the process, a much larger number of the photomasks used in the early steps of the fabrication process are required than the number of photomasks used in the latter steps of the mask. Thus, in normal high volume production, the method would result in wasting a large number of photomasks in a short period of time.

Integrated circuits are widely used as the storage elements and as the logic gates for digital computers and automated control systems. As a result, large numbers of the individually packaged integrated circuits are often interconnected by printed circuits, or other similar techniques, into a large system. In the last few years, yields have increased to the point where it is practical to fabricate a large number of integrated circuits on a single slice of semiconductor material, test the circuits in situ on the slice, and then interconnect only the good circuits into an array by one or more levels of thin film leads deposited over the slice. However, from one-fourth to one-third of the circuits on a slice may be faulty, and the faulty circuits occur at random positions on the slice.

This means that a very large number of different combinations of good circuits can result. A customized photomask, or set of photomasks, must therefore be generated to pattern the thin film lead patterns on each individual slice. This would be highly impractical using conventional techniques. The wiring masks can be generated by a computer controlled system. But such a system presupposes that each component or circuit is located at a predetermined position on the slice with considerable accuracy. Otherwise, a short or open circuit may be produced at some point where the lead pattern does not register with the circuits, and the entire arry would then be faulty.

There is, therefore, a pressing need for a system for generating photomasks in which the position of each pattern on the mask is located with an accuracy on the order of a few micro inches. The very best systems heretofore available for positioning the table of a step and repeat camera, or any other movable stage such as those used for automatically positioning machine tools, have positional accuracy on the order of forty micro inches, thus requiring an improvement of about an order of magnitude. Further, prior step and repeat cameras are capable of producing masks only about 1.5 inches square, although semiconductor slices about three inches in diameter are now available. On the order of one thousand individual integrated circuits may be placed on a slice having a nominal diameter of about one inch, and on the order of ten thousand circuits can be placed on a slice having a nominal diameter of three inches without decreasing the circuit size. This large number of exposures would take an extremely long period of time using previous step and repeat cameras.

This invention is concerned with an improved step and repeat camera for automatically generating one photomask or a complete set of photomasks required for producing an array of integrated circuits, or the like, with a positional accuracy on the order of a few micro inches. This can be achieved by sensing the movement of a film support table in X and Y coordinate directions by means of a laser interferometer and interference fringe counter, and continuously positioning the table in the X and Y coordinate directions by X and Y drive systems controlled in real time by a digital computer. The computer is programmed to compute the current position of the table from the fringe counts, compute the desired position of the table, and compute the force required by the drive system to move the table to the desired position and hold the table in the desired position for as long as required to make the exposure. Control of the table in real time by a computer is possible only if the table is supported by a very low friction support system which also maintains the table precisely within a predetermined plane. In addition, the table must be movable in one coordinate direction without changing its position in the other coordinate direction more than the desired tolerance value.

In accordance with this invention, the table is supported by constant pressure air bearings traveling over a level support surface to provide very low friction and to precisely position the table in the desired plane. In addition, the table is guided along each coordinate axis by a precision guide surface over which a fixed constant pressure air bearing travels to maintain the desired positional accuracy without introducing friction.

These and other novel features believed characteristic of this invention are set forth in the appended claims. The invention itself, however, as well as other objects and advantages thereof, may best be understood by reference to the following detailed description of an illustrative embodiment, when read in conjunction with the accompanying drawings, wherein:

FIG. 4 is a front elevational view of a portion of the table of the camera of FIG. 1 partially broken away to reveal details of construction;

FIG. 5 is a plan view, partially broken away, of the portion of the table shown in FIG. 4;

FIG. 6 is an end view, partially broken away, of the portion of the table shown in FIG. 5;

FIG. 7 is a sectional view taken substantially on lines 7—7 of FIG. 5;

FIG. 8 is a partial sectional view showing a detail of construction of the portion of the table shown in FIG. 5;

FIG. 15 is an elevational view of the outer face of one of the uprights of the camera of FIG. 1;

FIG. 16 is a sectional view taken substantially on lines 16—16 of FIG. 15;

FIG. 17 is an elevational view of the inner face of the upright shown in FIG. 15;

FIG. 18 is a sectional view taken substantially on lines 18—18 of FIG. 17;

FIG. 19 is a top view of the upright shown in FIG. 15;

FIG. 20 is a sectional view taken substantially on lines 20—20 of FIG. 15;

FIG. 21 is a top view of the upper stage of the camera of FIG. 1;

FIG. 22 is a front elevational view of the upper stage shown in FIG. 21;

FIG. 23 is a bottom view of the upper stage shown in FIG. 21;

FIG. 24 is an enlarged view of the portion broken away in FIG. 22

FIG. 25 is a sectional view taken substantially on lines 25—25 of FIG. 21

FIG. 26 is a top view of the lower stage of the camera of FIG. 1;

FIG. 27 is a sectional view taken substantially on line 27—27 of FIG. 26;

FIG. 29 is a more detailed schematic block diagram of a portion of the control circuit illustrated in FIG. 28;

FIG. 30 is a graph illustrating the operation of the portion of the control circuit shown in FIG. 29;

Figure 1:
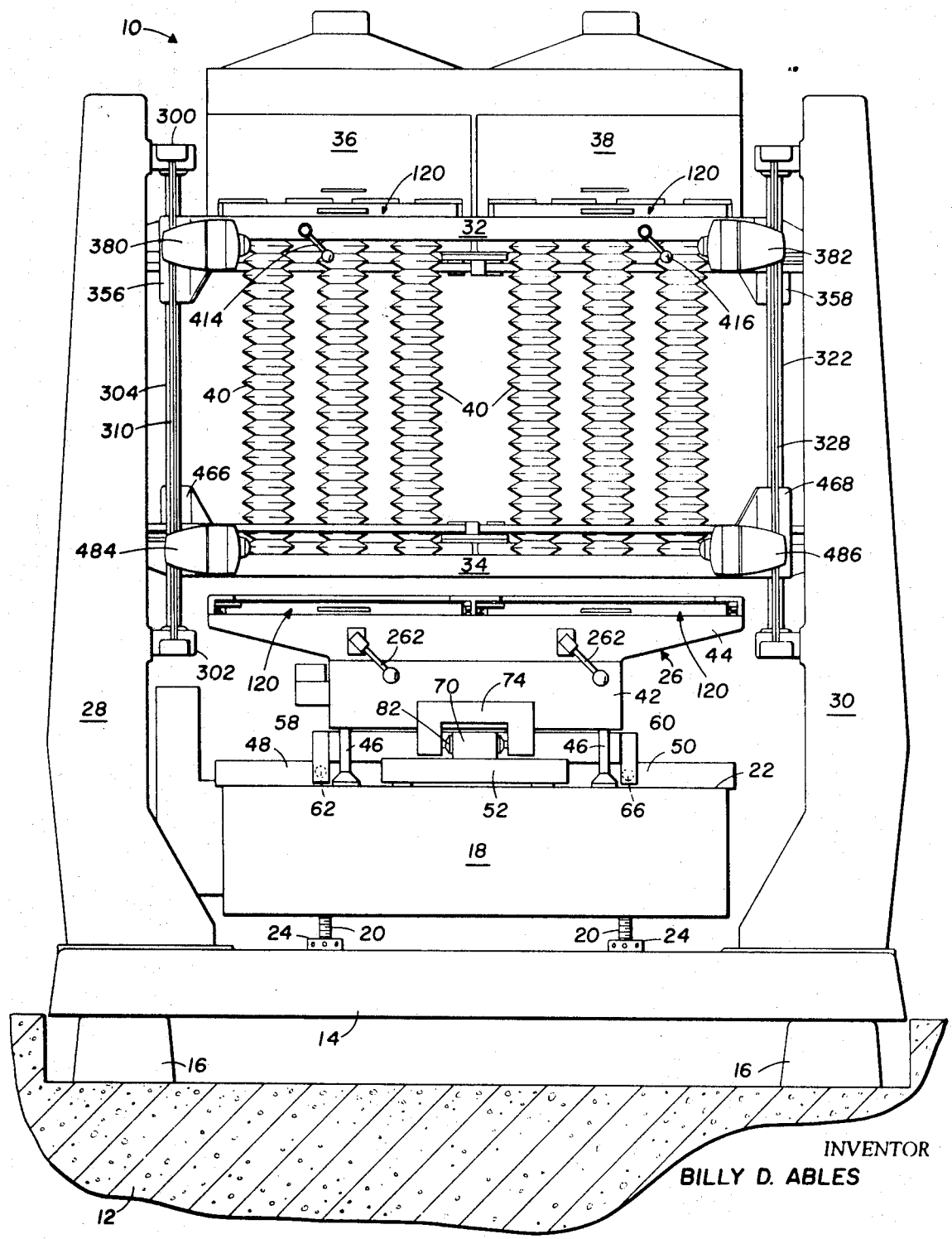
FIG. 1 is a front elevational view of a step and repeat camera constructed in accordance with the present invention.
Figure 28:
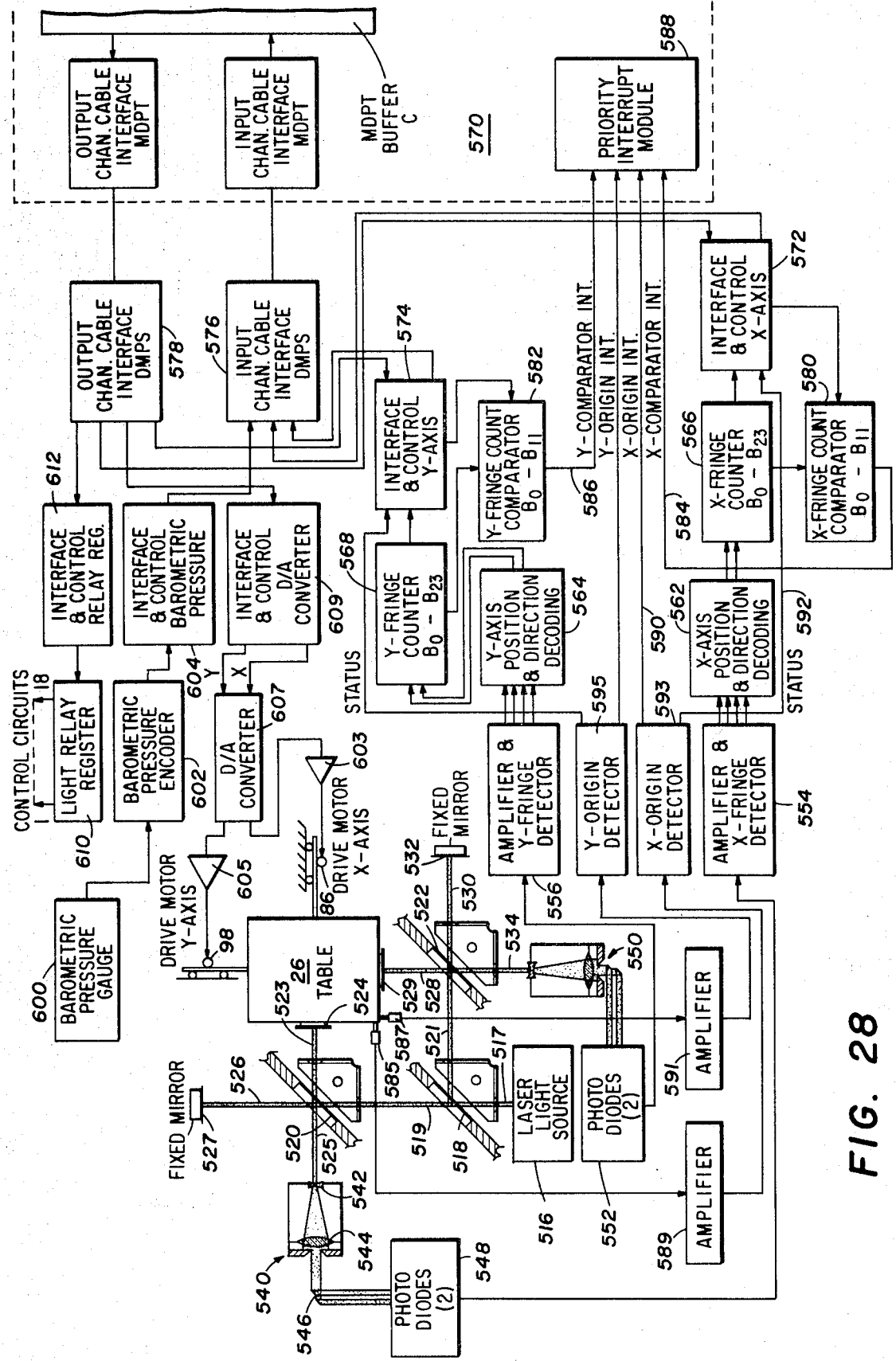
FIG. 28 is a schematic block diagram of the control system for the camera of FIG. 1.
Figure 32B:
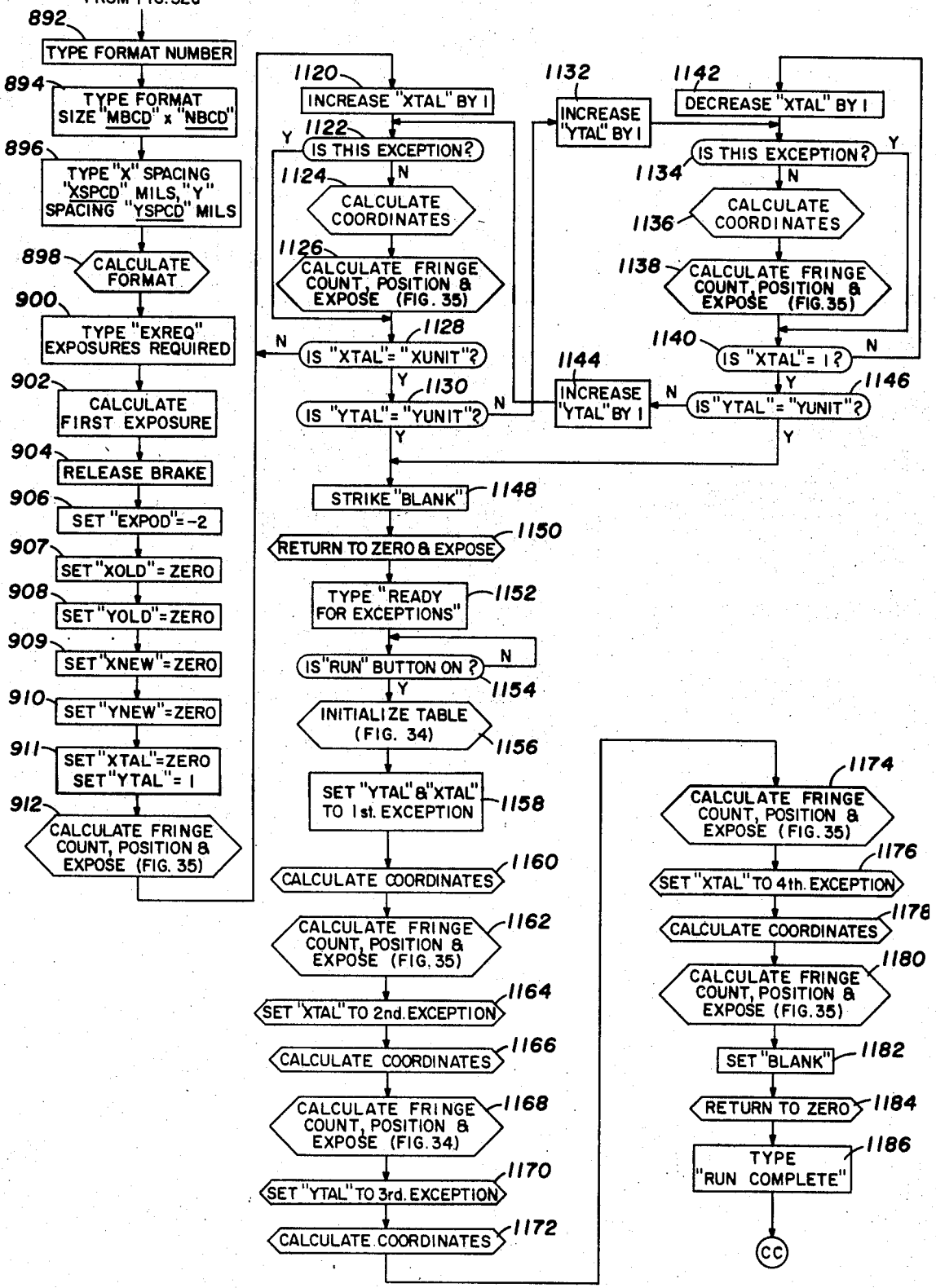

FIGS. 32a and 32b, taken together, are a simplified flow diagram of the program of the computer shown in FIG. 28 which is used to control the step and repeat camera illustrated in FIG. 1;

FIGS. 33–41 are flow diagrams illustrating subroutines within the program represented in FIGS. 32a and 32b; and FIG. 42 is a graph which plots the force applied for a given positional error in order to maintain the table at a predetermined position during exposure.

Referring now to the drawings, a step and repeat camera constructed in accordance with the present invention is indicated generally by the reference numeral 10 in FIG. 1. The camera 10 is mounted on a massive concrete block 12 which is suspended from springs (not illustrated) for isolating the block 12 from the vibrations of the earth. The springs are adjustable so that the concrete block can be leveled. If desired, a pneumatic, self-leveling system can be employed. A base casting 14 is mounted on the concrete block 12 by legs 16. A lower granite block 18 is supported on the base casting 14 by three triangularly spaced threaded rods 20 and nuts 24 which rest on casting 14. The upper surface 22 of block 18 is highly planar and is disposed precisely level by adjustment of the nuts 24 on the threaded rods 20 which rest on the base casting 14. A film support table, indicated generally by the reference numeral 26, is movable in X and Y coordinate directions over the planar surface 22 of the lower granite block 18.

A pair of uprights 28 and 30 are connected to the base casting 14 and extend upwardly on either side of table 26. Upper and lower stages 32 and 34 are mounted on the uprights 28 and 30 for adjustable movement in the vertical direction. The upper stage 32 supports a pair of light houses 36 and 38 each of which contains nine light sources. Each light source includes a lamp and a lens system to project light along eighteen separate optical axes. The upper stage has facilities for supporting a master transparency for each optical axis. The lower stage 34 supports a reducing lens for each of the optical axes, and a bellows 40 for each optical axis extends between the upper and lower stages. The table has provision for supporting a photographic plate on each optical axis so that it will be exposed by the image produced by directing light from the source through the respective transparency and reducing lens onto the photographic plate. Each of the transparencies carries the pattern required for a different photomask used for the different steps of the semiconductor fabrication process. When table 26 is indexed to successive exposure positions, all plates carried by the table are simultaneously exposed so that the exposures will have the same positional errors. All of the patterns on the photomask can then be made to register simultaneously. The eighteen separate optical axes permit a set of photomasks for an eighteen step fabrication process to be produced.

An important aspect of the present invention is to be able to position each exposure on each film plate at any desired location within a field of travel several inches square, with a positional tolerance of only a few micro inches. This not only requires positioning of the table 26 within that tolerance, but also dictates that the apparatus 10 be located in a room where the temperature is maintained constant within a fraction of a degree. Otherwise, expansion of the mechanical parts of the camera will move the transparencies or plates by an amount greater than the specified limits. Similarly, vibrations set up in the machine either from the earth or from within the machine may cause elongations and contractions which would result in the inability to meet the tolerances. These problems are compounded by the very large size of the camera 10 required in order to achieve the large field of travel and a high photographic reduction ratio of as much as 20:1.

The table 26 is comprised of a granite block 42 which supports a metal casting 44. The granite block 42 is supported by four conventional constant pressure air bearings 46 which ride on the surface 22 of granite block 18. Each of the air bearings 46 has a planar bottom surface disposed adjacent to the highly planar surface 22 of the lower granite block 18. Gas, typically nitrogen, is pumped under a constant pressure through the center of each air bearing 46 so that the table 26 is continuously supported by a very thin layer of gas, typically on the order of two microns thick. As a result, the table 26 can be moved over the supporting granite block 18 with a minimum of friction. The gas supply and the individual pressure regulator provided for each air bearing are not illustrated.

Movement of the table 26 is precisely controlled by a guide and drive system which includes a first guide means formed by glass bars 48 and 50 which are mounted on the lower granite block 18. The edge faces 48a and 50a of the bars 48 and 50 are optically flat and are precisely aligned, and the opposite edge faces 48b and 50b are substantially flat and parallel to the optically flat faces. An intermediate stage is formed by granite slabs 52 and 54 which are rigidly interconnected by a third granite slab 56. The slabs 52 and 54 are disposed on opposite sides of the guide rails 48 and 50 and the third slab 56 bridges over bars 48 and 50. Slabs 52 and 54 are supported by pairs of air bearings 53 and 55, respectively, which ride on surface 22 of block 18. A pair of inverted U-shaped yokes 58 and 60 are fixed to the bridge slab 56 and extend downwardly to stand off from the opposite edge faces of guide rails 48 and 50. The yoke 58 carries a fixed air bearing 62, which rides on the optically flat edge face 48a, and a pneumatically biased air bearing 64 which rides on the opposite face 48b and continually biases the fixed air bearing 62 against face 48a with a constant force. Similarly, the yoke 58 has a fixed air bearing 66 which rides on the optically flat edge face 50a, and a pneumatically biased air bearing 68 which rides on the opposite face 50b to continually force air bearing 66 against the reference face with a constant force. Thus the intermediate stage is free to move only in the X coordinate direction and is retained at a predetermined Y coordinate over its entire travel within the design tolerance of a few micro inches.

A second guide means is formed by glass bars 70 and 72 mounted on slabs 52 and 54 and have optically flat surfaces 70a and 72a which are aligned precisely at right angles to the optically flat surfaces 48a and 50a. The opposite faces 70b and 72b are substantially flat and substantially parallel to faces 70a and 72a. A second pair of inverted U-shaped yokes 74 and 76 are fixed to opposite edges of the granite block 42, and have fixed air bearings 78 and 80 which ride on the optically flat surfaces 70a and 72a, and pneumatically biased air bearings 82 and 84 which ride on edge surfaces 70b and 72b to bias the fixed bearings against the reference surfaces with a constant force.

The granite block 42, and hence the table 26, can be moved in the X direction along guide rails 48 and 50 by means of an X axis drive system comprised of a printed circuit motor 86, which is mounted on upright 28, and drives a wheel 88 which frictionally engages one edge of a drive bar 90. The bar 90 is connected to the intermediate stage by a rod 92. A pair of idler rollers 94 are spring biased against the opposite edge of drive bar 90 to maintain a substantially constant force between the drive wheel 88 and the drive bar 90. The opposite end of the drive shaft of printed circuit motor 86 is provided with a pneumatically operated disk brake which is represented schematically at 96.

The granite block 42, and hence table 26, can be moved in the Y coordinate direction by a second printed circuit motor 98 which drives wheel 100. Wheel 100 frictionally engages one edge of a bar 102 which is connected to yoke 76, and therefore to block 42, by a rod 104. The Y axis drive motor 98 and idler rollers 106 are mounted on slab 54 by a suitable means represented by bracket 108. A pneumatically operated brake 110 is also provided on the shaft of the printed circuit motor 98. Thus printed circuit motor 86 moves the table 26 in the X coordinate direction, and printed circuit motor 98 moves the table in the Y coordinate direction. As will hereafter be pointed out in greater detail, the brakes 96 and 110 are used only when the system is not in operation and are not used to position the table during exposure.

The casting 44 of the table 26 is shown in detail in

FIGS. 4–8. The casting 44 is adapted to receive a pair of multiple plate carriers, each indicated generally by the reference numeral 120, in precisely predetermined positions relative to the optical axes. As will hereafter be evident, at least four of the film plate carriers 120 are required for full operation of the camera system. One of the film carriers 120 is illustrated in detail in FIGS. 9–14. Each film carrier is comprised of a base plate 122. A peripheral side wall 124 is integral with the base plate 122 and extends around the entire periphery of the base plate. A lid 126 is connected to the peripheral side wall 124 by hinges 128 and 130.

The carrier 120 has nine identical compartments formed by interior walls 132, which are also integral with the front plate 122, and the peripheral side wall 124. Aligned square openings 122a and 126a are provided in the base plate 122 and lid plate 126 at each compartment to permit light to be projected through a film plate disposed in the compartment. Each compartment is adapted to receive a standardized square glass photographic plate 134 and to hold the plate in a precisely oriented position relative to the carrier. Orientation longitudinally of the optical axes, which may be considered the Z axis, and also pitch orientation about the X and Y axes, is provided by three studs 136 which project into each compartment from the base plate 122. The film plate 134 is oriented along the X and Y directions, and also in rotation about the Z axis, by a pair of banking lugs 138 and 140 which are pivotally mounted on pins 142 and 144, respectively, and a third lug 146 which is pivotally mounted on a pin 148. The edges of lugs 138, 140 and 146 are straight along the dimension extending longitudinally of the edge of the film plate so as to engage the edge of the plate 134 along a substantial distance, but are rounded in the direction normal to the film plate so as to engage only the center of the edge of the film plate 134. This curvature can best be seen in FIG. 12.

Two adjacent edges of the film plate 134 are biased against the banking lugs 138, 140, and 146 by an assembly comprised of springs 150 and 152 and an elbow-shaped member 154 which engages the corner of the film plate opposite the edges which abut the banking lugs. The elbow-shaped member 154 is retained in position when the film plate 134 is removed by a pin 156 which is received in an oversized hole (not illustrated) in the elbow-shaped member 154. The pin 156 has a head larger than the oversized hole to retain the member 154 in place on the pin.

Each film plate 134 is urged downwardly against the three positioning studs 136 by leaf springs 160 which are carried by the lid plate 126 and engage the glass plate 134 directly over each of the studs 136. The lid plate 126 is held against the cumulative force of the leaf springs 160 by a pair of fasteners 161. Each fastener is comprised of a strap 162 which is fixed to the lid plate 126. An aperture 164 in each strap receives the rouned end of a stud 166 which is slidably disposed in the side wall 124 and is biased outwardly by a leaf spring 168.

Each of the film plate carriers 120 has a pair of flat banking surfaces 170 and 172 formed on the outer surface of one peripheral side wall 124, and a third banking surface 174 formed on the adjacent side wall. The banking surfaces 170, 172 and 174 on each carrier 120 are in precisely predetermined relationship to the banking lugs in each compartment of the carrier. The base plate 122 has a number of precision ground reference surfaces 176, shown in dotted outline in FIG. 9, which lie in a common plane. The ends of all of the blanking studs 136 in all of the compartments also lie in a common plane disposed parallel to the plane of the reference surfaces 176. A handle 180 is attached to the peripheral wall 124 to facilitate handling the carrier 120.

The film plate carriers 120 are used to carry both the unexposed film plates for table 26, and also the master transparencies, for the upper stage 32 through which light is projected. The carriers 120 are easily loaded merely by placing the carrier on a table with the reference surface 176 down, releasing the latch assemblies 161, and raising lid plate 126. The film plates 134 may then be placed in the respective compartments merely by manually moving the elbow-shaped member 154 against the force of springs 150 and 152, placing the plates on the studs 136 with the photosensitive emulsion or the phototransparency face down, and releasing the elbow-shaped member 154. The springs 150 will then bias the plate 134 securely against the banking lugs 138, 140 and 146 to precisely position the plate relative to banking surfaces 170, 172 and 174. After all of the plates 134 are loaded in the respective compartments in this manner, the lid plate 126 is closed and the fasteners 161 latched so that the springs 160 securely hold the plates 134 in place against reference studs 136 which precisely orient the plates parallel to the plane of reference surfaces 176. The plate carrier 120 can then be easily taken to the camera 10 and inserted as will presently be described.

Referring once again to FIGS. 4–8, the casting 44 of table 26 is adapted to receive a pair of the plate carriers 120, although only one carrier is illustrated in the drawings. The casting 44 has a W-shaped top plate 200 forming two openings 202a and 202b each of which is slightly larger than the array of nine openings 122a in the base plate of a carrier 120. The carriers 120 can be inserted into openings in the front of the casting 44 and be slid into position beneath openings 202a and 202b on rails 208 and 210 extending along opposite sides of the openings. A pair of banking lugs 212 and 214 are pivotally mounted on pins 216 and 218 at the right hand side of each of the openings 202a and 202b and are spaced to engage the machined reference surfaces 170 and 172, respectively, on a carrier 120. A third banking lug 220 is pivotally mounted on pin 222 at the rear of each opening 202a and 202b and is spaced to engage the reference surface 174 on the carrier 120. The carrier 120 is biased against the banking lugs 212, 214 and 220 by a lever 224 which is pivoted on a pin 226 and is biased against the corner of the carrier 120 by a coil spring 228 as shown in the detail of FIG. 8.

Four adjustable alignment studs 206 are disposed around each of the openings 202a and 202b, although only three are shown around opening 202 in FIG. 5, and extend downwardly through the top plate 200 and terminate in a common plane parallel to the surface 22 of the granite block 18. A hand operated mechanism is provided to raise each of the carriers 120 from the rails 208 and 210 to hold it tightly against the respective sets of downwardly projecting alignment studs 206. This mechanism is best illustrated in the right-hand section of FIGS. 4 and 5 and in FIGS. 6 and 7. A pair of shafts 230 and 232 are journaled in side walls 234 and 235 and an intermediate rib 236 of the casting 44. Throws 244 and 246 are fixed to shafts 230 and 232, respectively, by pins, and a box beam 238 is pivotally connected to the throws 244 and 246 by pins 240 and 242. A pair of spring supported stools 248 and 250 extend upwardly from the beam 238. A second beam 252 is identical to the beam 238 and extends between throw pins (not illustrated) on throw plates 254 and 256 which are mounted on shafts 230 and 232. A second pair of spring biased stools 258 and 260 extend upwardly from beam 252. A connecting rod 264 which is pivotally connected to throw plates 244 and 246 by pins 266 and 268, and an identical connecting rod 270 is pivotally connected to throw plates 254 and 256 so that shafts 230 and 232 can be simultaneously rotated by manipulating a hand lever 262, which is keyed on shaft 230. The lift mechanism associated with opening 202a is identical, except that the hand lever 262 is mounted on shaft 232. When hand lever 262 is moved to the position illustrated in the right-hand half of the figures, the stools 248, 250, 258 and 260 are lowered so that the carrier 120 rests on slide rails 208 and 210. When the lever 262 is moved counterclockwise, to the position of the left-hand lever 262, stools 248, 250, 258, and 260 are raised to engage the lid plate of the carrier 120 and raise the reference surfaces 176 on the base plate against the downwardly projecting studs 206.

Images are produced and projected onto the photographic plates 134 in the carriers 120 inserted in the table 26 by an image reduction and projection system comprising the upper stage 32 and lower stage 34 which are supported by uprights 28 and 30. The uprights 28 and 30 are identical and accordingly only upright 28 will now be described in detail. Upright 28 is primarily a metal casting, as shown in FIGS. 15–20, which is bolted to the base casting 14. The upright 28 must be very rigid and free from vibration in order to achieve the desired tolerances. Upper and lower cast brackets 300 and 302 are bolted to upright 28. Vertically disposed front and rear guide rods 304 and 306, a ball screw 308, and a calibrated rod 310 all extend between and are fixed to brackets 300 and 302. A pair of brake rods 312 are supported within the upright 28 and extend from a fixture 314 near the top of the upright to a block 316 near the lower bracket 302 which in turn is supported by a pair of legs 318. Legs 318 are bolted to flanges 320 which are cast integral with the upright 28. Upright 30 similarly supports front and rear guide rods 322 and 324, a central ball screw 326, a calibrated rod 328, and a pair of brake rods 330, which can be seen in FIGS. 21 and 23, for example.

The upper stage 32 is comprised of a casting 350 which extends between the uprights 28 and 30. The casting 350 is supported by ball screw sprockets 352 and 354 which are journaled in the casting 350 and are threaded onto the fixed ball screws 308 and 326, respectively. The casting 350 is stabilized at two diagonally opposite corners by elongated linear ball bearings 356 and 358 which are disposed around and travel on guide rods 304 and 324. The linear ball bearings 356 and 358 have considerable length and therefore have the capability of providing stability against movement about an axis extending diagonally between the guide rods 304 and 324.

Figure 2:
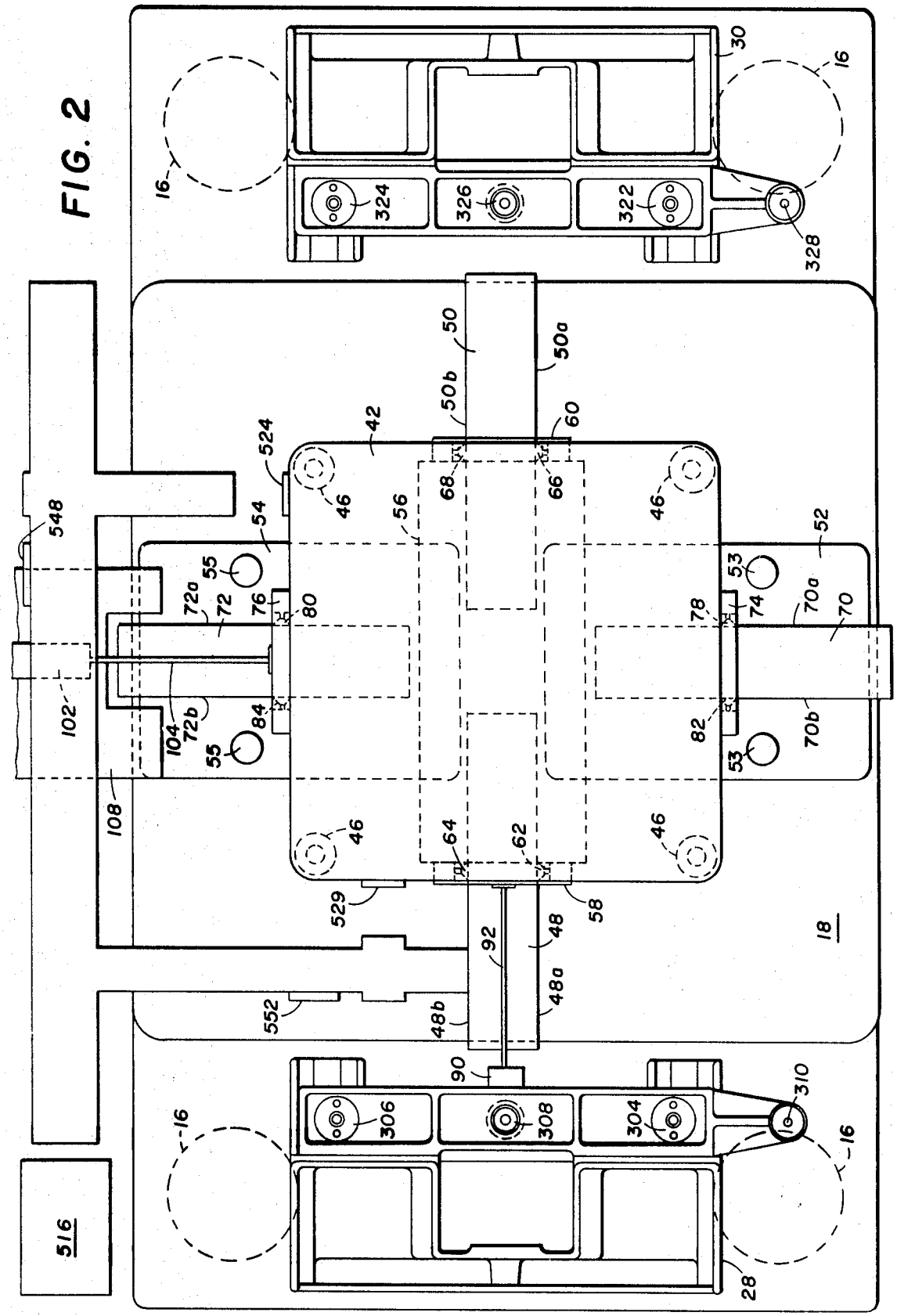
FIG. 2 is a plan view of the camera of FIG. 1 with the upper stages removed to better illustrate the movable table.
Figure 3:
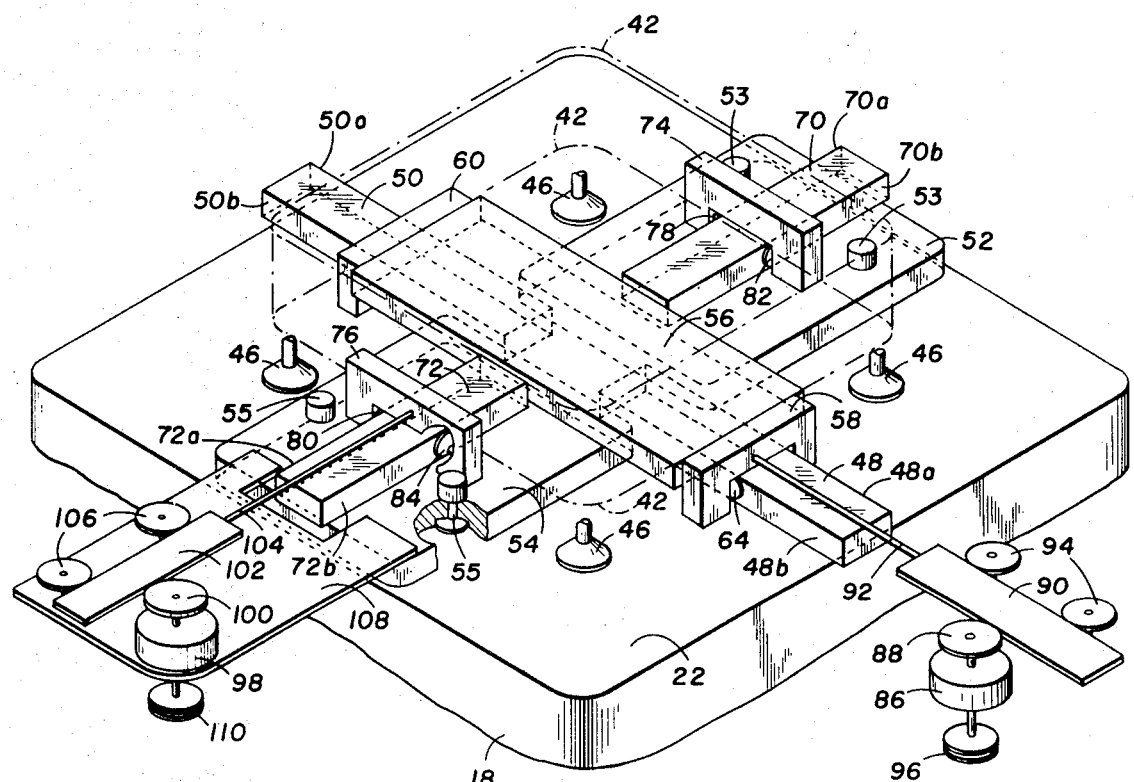
FIG. 3 is a simplified isometric view of the support and drive means for the movable table of the camera of FIG. 1.

The upper stage 32 can be selectively raised and lowered by an electric drive motor 360 which drives a flexible steel band 362 by means of sprocket 364. As can best be seen in FIG. 2, the steel band 362 is perforated and the drive sprocket 364 has mating stub projections to assure a positive drive. The flexible steel band 362 passes around idler pulley 365, ball screw sprocket 352, idler pulley 366, spring biased take up pulley 367, idler pulley 368, sprocket 354, and idler pulley 369. Sprockets 352 and 354 also have mating projections which are received in the holes in the steel band 362 to assure a positive drive.

Individually controllable pneumatic brakes 370 and 372 are mounted on opposite ends of the casting 350 and engage the brake rods 312 and 330, respectively. Each brake assembly is comprised of a pair of plates disposed on opposite sides of the respective brake rods. The rod from a pneumatic cylinder extends between the two brake rods to clasp the two brake disks against opposite sides of the rods when the cylinder is actuated. A set of counterweights 374 is connected to each end of the upper stage 32 by a chain 376 which extends from a shouldered sleeve 377 (see FIG. 20) up through the set of counterweights and over a sprocket 378 journaled on the upright to a bracket 379 on the upper stage.

A pair of optical devices 380 and 382 are fixed to opposite ends of the front edge of the casting 350 for determining the precise position of the ends of the stage relative to the calibrated rods 310 and 328. The upper stage 32 may be positioned at any selected height above the table 26 by operating the motor 360 until one end, as determined by means of the optical viewing device 380, for example, is at the selected height. Then the brake 370 is set to securely lock that end at the desired height. The motor 360 is then pulsed in the proper direction until the other end is at the desired height, and the other brake 372 is set. The play in even the best ball screw assemblies is sufficient to permit the opposite ends of the stage to be individually set at the desired height within the required tolerance.

The casting 350 of the upper stage 32 is also adapted to receive a pair of downwardly facing plate carriers 120 in the positions illustrated in dotted outline in FIG. 21. Each of the carriers 120 is precisely positioned in the X and Y coordinate direction by the same type of banking system as heretofore described in connection with FIGS. 4–8, including three pivotally mounted banking lugs 390, 391 and 392, and a spring loaded pivoted lever 394. The carriers 120 are positioned with the reference surfaces 176 on the base plate 122 facing downwardly with the reference surfaces 176 normally resting on four upwardly projecting reference stops 395 which are shown in detail in FIG. 25. The plate carriers 120 may be raised from the stops 395 on rails 418 and 420 by a hand operated mechanism shown in the enlarged sectional view of FIG. 24. A pair of shafts 400 and 402 are journaled in the casting 350. The shaft 400 carries four cams 404 and shaft 402 carries four cams 406. Each of the cams 404 and 406 has a configuration substantially as illustrated in FIG. 24. Rails 418 and 420 are supported on push rods 422 and 424 which extend downwardly and ride on cams 404 and 406. A pair of connecting rods 408 and 410 are pivotally connected to the cams 404 and 406 which are disposed adjacent the ends of the shafts 400 and 402 by eccentrically located pivot pins 412, as shown in FIG. 24, so that both shafts will be rotated in unison. A hand lever 414 is connected to the shaft 400 at the left-hand side of the stage and a hand lever 416 is connected to the shaft 402 at the right-hand side of the stage to rotate the levers. Thus, when the hand levers 416 are operated, the rails 418 and 420 can be raised to lift the plate carriers 120 from the stops 395, and the carriers may then be removed by sliding the carriers over the rails 418 and 420.

The upper stage 32 carries a pair of identical light houses 36 and 38. Each light house has nine conventional light sources each of which may include an electric lamp, a suitable lens, and a filter, if required. A forced air cooling system may be provided to cool the light sources. Each light source is individually controlled by the computer which will presently be described. A suitable system for maintaining the intensity of each light source constant may also be provided if required.

The lower stage 34, illustrated in detail in FIG. 26 and 27, carries the image reduction lens of the projection system. The lower stage 34 is comprised of a casting 460 having substantially the same plan configuration as the casting 350 of the upper stage 32. The casting 460 is supported by ball screw sprockets 462 and 464 which are threaded onto the fixed ball screws 308 and 326, respectively. The lower stage is stabilized by linear ball bearings 466 and 468 which are disposed around guide rods 306 and 322. The lower stage 34 may be raised and lowered by a drive system that is identical to that used to raise and lower the upper stage 32. The drive system is comprised of a drive sprocket 470 operated by an electric motor (not illustrated), a perforated flexible steel band 472, and idler pulleys 473–477. The power required by the drive system to move the lower stage is reduced to a desired level by two sets of counterweights 478 which are connected to the opposite ends of the stage by chains 479 which pass over sprockets 481 journaled on the uprights and are connected to the stages by brackets 483. The lower stage 34 also has pneumatically operated brakes 480 and 482 at each end which engage the brake rods 312 and 330 in the same manner as brakes 470 and 372 heretofore described in connection with the upper stage 32. The position of each end of the lower stage 34 is also determined by optical devices 484 and 486 which permit accurate alignment with the calibration marks on rods 310 and 328.

The casting 460 has eighteen sleeves 488 which are adapted to receive lens barrels 490. As illustrated in FIG. 27, each of the lens barrels 490 is adapted to receive any desired lens assembly. A typical twenty power lens assembly is shown at 492, a typical ten power lens assembly is shown at 494, and a typical five power lens assembly is shown at 496. Of course, all lens assemblies used at the same time will normally have the same power, the three different powered lenses being shown merely for purposes of illustration.

Each of the lens barrels 490 has a rib 498 which is urged against the interior wall of the sleeve 488 by a leaf spring 500 located on the opposite side of the barrel. The axial alignment of each lens barrel 490 may be adjusted by two sets of thumb screws 502 and 504. As can best be seen at the right-hand side of FIG. 27, the upper thumb screws 502 pass through a flange 506 on the barrel 490 and are threaded through a ring 508. The lower ends of the screws 502 rest on ball bearings 510 located in wells in the upper ends of sleeves 488. The thumb screws 504 are threaded onto the thumb screws 502 and compress coil springs 512 against the flange 506. The flange 506 is supported on the ring 508 by a pair of ball bearings 514 shown in connection with the center lens in FIG. 27. It will be noted that the bearings 514 are disposed on an axis located at 90° to the axis of the bearings 510, and that these two axes are disposed at 45° to the axis formed by the projection 498 and the spring 500. Thus, the lens barrels may be adjusted to align the axis of each lens with the optical axis of the projected light.

Each of the bellows 40 is suspended from the casting 350 of the upper stage 32. The lower ends of nine of the bellows 40 are connected to a plate 501, and the lower ends of the other nine bellows 40 are connected to plate 503. The plate 501 has nine depending tubular sleeves 505, and plate 503 has nine similar depending sleeves 507. The plates 501 and 503 may be simultaneously raised or lowered by a windlass mechanism including shafts 511, 513 and 515 intercoupled by suitable gearing arrangements and journaled in the casting 350. An electric motor 509 drives shaft 511, and hence shafts 513 and 515. Flexible cords 517 and 519 are connected to the corners of plates 501 and 503, respectively, and are wound on shafts 511 and 515. When motor 509 is operated in one direction, the shafts 511 and 515 are rotated in a direction such as to wind the flexible cords 517 and 519 up and raise plates 501 and 503. When the motor 509 is operated in the other direction, the plates 501 and 503 are lowered.

The position of the table 26 in the X and Y coordinate directions is measured by detecting and counting the interference fringes of a laser interferometer resulting from movement of the table from a reference position. The interferometer is compromised of a helium-neon laser 516 which projects a beam of light 517 onto a first partially silvered mirror as shown in FIG. 28. A portion of the beam 517 continues along path 519 to a second partially silvered mirror 520. A portion of the light beam striking mirror 520 is reflected along path 523 to an adjustable mirror 524 carried by the table 26. The light is reflected back from mirror 524 substantially along path 523 to the mirror 520 where a portion of the light continues along path 525. The other portion of the light in beam 519 striking the partially silvered mirror 520 continues along path 526 to a fixed mirror 527 where it is reflected back to the partially silvered mirror 520. A portion of the light reflected from mirror 527 is reflected along path 525 and a portion continues back generally along path 519. The mirror 527 is disposed precisely perpendicular to the beam 526, but the mirror 524 is adjusted to an angle slightly different from ninety degrees. As a result, the portion of the coherent light projected along beam 525 from the mirror 527 combines with the coherent light from the mirror 524 to produce interference fringe lines having a substantially sinusoidal variation in illumination along the axis extending in the direction the mirror 524 is tilted. As the table 26 moves in either the positive or negative direction along the X axis, i.e., away or toward mirror 520, the degree of illumination at any point in the interference pattern goes through one complete cycle each time the table moves one-half wavelength.

A portion of the beam of light 517 is reflected along path 521 to a third partially silvered mirror 522 where it is again divided and one portion directed along path 528 to a mirror 529 attached to the table 26, and the other portion directed along path 530 to a fixed mirror 532. The light reflected from the mirror 529 that passes through mirror 522 and the light reflected from mirror 532 that is reflected from mirror 522 combine to produce interference fringes in beam 534 so that movement of the table 26 along the Y axis will cause the degree of illumination at any fixed point illuminated by the fringe pattern to vary through one complete sinusoidal cycle each time the table moves a distance of one-half wavelength.

The interference pattern in beam 525 is expanded by an optical system indicated generally by the reference numeral 540 which is comprised of lenses 542 and 544. A pair of mirrors 546 positioned at an angle to the beam and spaced along the beam divided the beam into two spaced beams each of which is directed onto a photodiode 548. The beam 534 is expanded and separated by an identical optical and mirror system 550 and the separated beams projected onto a pair of diodes 552. The outputs of diodes 548 are applied to an amplifier and X fringe detectors 554, and the outputs from diodes 552 are applied to an identical amplifier and Y fringe detector 556.

The photodiodes 548 and the amplifier and X fringe detector 554 are illustrated in greater detail in FIG. 29. The output of photodiodes 548a and 548b are connected to the inputs of operational amplifiers 560a and 560b, respectively. The output of amplifier 560a is connected to one input of a high speed comparator I and to an input of high speed comparator II. The output of amplifier 560b is similarly connected to an input of high speed comparator III and to an input of high speed comparator IV. A first reference voltage $T_1$ is connected to the reference inputs of comparators I and III, and a second reference voltage $T_2$ is connected to the reference inputs of comparators II and IV.

The outputs of photodiodes 548a and 548b, and hence the outputs of operational amplifiers 560a and 560b, is a sinusoidal signal as shown in FIG. 30 having a frequency of from zero to thousands of cycles per second, depending upon the velocity of the table 26. The output of each of the comparators I–IV is a logic "1" level when the voltage from the respective amplifier 560a or 560b exceeds the threshold reference voltage $T_1$ or $T_2$, and is a logic "0" level when the threshold reference voltage exceeds the signal voltage from the respective operational amplifier. The output voltages of the amplifiers 560a and 560b are represented by curves 560a and 560b. The tilt of mirrors 524 or 539 on the table 26 is adjusted so that the output from amplifier 560b lags the output from amplifier 560a by ninety degrees. The threshold levels $T_1$ and $T_2$ are then adjusted so that the output of comparators I–IV are as illustrated in FIG. 30 where it will be noted that each fringe cycle is divided into eight equal parts, and that each of the eight parts is uniquely identifiable from the four logic outputs. Since the light from a helium-neon laser has a wavelength of about 24.8 micro inches, a table movement of about 1.55 micro inches can be detected by detecting a change in the logic outputs of the four comparators. In addition, the direction of movement of the table can be determined from the logic outputs of the four comparators using conventional decoding techniques.

An X axis position and direction decoder 562 and a Y axis position and direction decoder 564 each produce a pulse for each 1.5 micro inch movement of the table 26 in the X and Y coordinate directions, respectively, and also produce logic signals indicating whether the table is moving in the positive or negative X and the positive or negative Y directions, respectively. The pulse signals from decoders 562 and 564 are applied to twenty-four bit X and Y fringe counters 566 and 568, respectively. The fringe counters 566 and 568 increment one count each pulse from the respective decoders when the table is moving in a positive coordinate direction, and decrement one count when the table is moving in a negative coordinate direction as determined by the direction signal from the respective decoding logic circuits 562 and 564.

The count of the fringe counters 566 and 568 may be read by a digital computer 570 through an X axis interface and control 572 and a Y axis interface and control 574, respectively, and input and output interfacing networks 576 and 578. Twelve bit X and Y fringe count comparators 580 and 582 can be set by the computer through the X and Y axis interface and control circuits 572 and 574. Then when the fringe counters 566 and 568 reach the count set into the respective comparators 580 and 582, X and Y comparator interrupts are generated and sent to the priority interrupt module 588 of the computer 570 by channels 584 and 586. Only one interrupt signal can be generated for each time the comparator is set by the computer to prevent the generation of false interrupt signals due to counter noise.

The zero reference position of the table 26 in the X and Y coordinate directions is detected by Brown and Sharpe electronic gauge systems 585 and 587. The electronic gauge produce a half-rectified 10 kHz. signal impressed on a D.C. level which varies from −0.2 volts to +0.2 volt for a table position of from −30 to +30 micro inches relative to the zero reference point. The outputs from the gauges 585 and 587 are first amplified by amplifiers 589 and 591, and then applied to X and Y origin detectors 593 and 595. The origin detectors each includes a high speed comparator which convert the analog signal to a logic signal, and two single shot circuits which generate an interrupt signal when the table passes the zero reference point in either direction. The X and Y origin interrupt signals are applied to the priority interrupt module 588 of the computer by channels 597 and 599. The origin detectors also include a flip-flop which is set and reset by the output from the single shot circuits to provide a status signal representative of whether the table is on the positive or negative side of the zero reference position, and these status logic signals are supplied to the computer interface and control circuits 572 and 574, respectively, and the input interface 576.

The wavelength of light in air varies with pressure, temperature and humidity. In order for the table to be positioned with the desired tolerance, the camera 10 should be located in a room in which the temperature is maintained substantially constant, for example, within ±0.5 F., and the humidity should be maintained within a selected range. Since it is impractical to control the barometric pressure within the room, a barometric pressure gauge 600 measures the pressure in the room, and this pressure is digitally encoded by encoder 602. The digital information is continuously available to the computer 570 through the barometric pressure interface and control circuit 604, and the input interface 576. The X axis and Y axis drive motors 86 and 98 exert a force proportional to the voltage applied to amplifiers 603 and 605 by a digital-to-analog converter 607. The output of digital-to-analog converter for controlling the X and Y drive motors is set by the computer 570 through interface 578 and the interface and control 609 for the digital-to-analog converter. The exposure lamps 430 in the light houses mounted on the upper stage are individually controllable by a light relay register 610 which in turn is controlled by the computer 570 through output interface 578 and the relay register interface and control 612.

Figure 31:
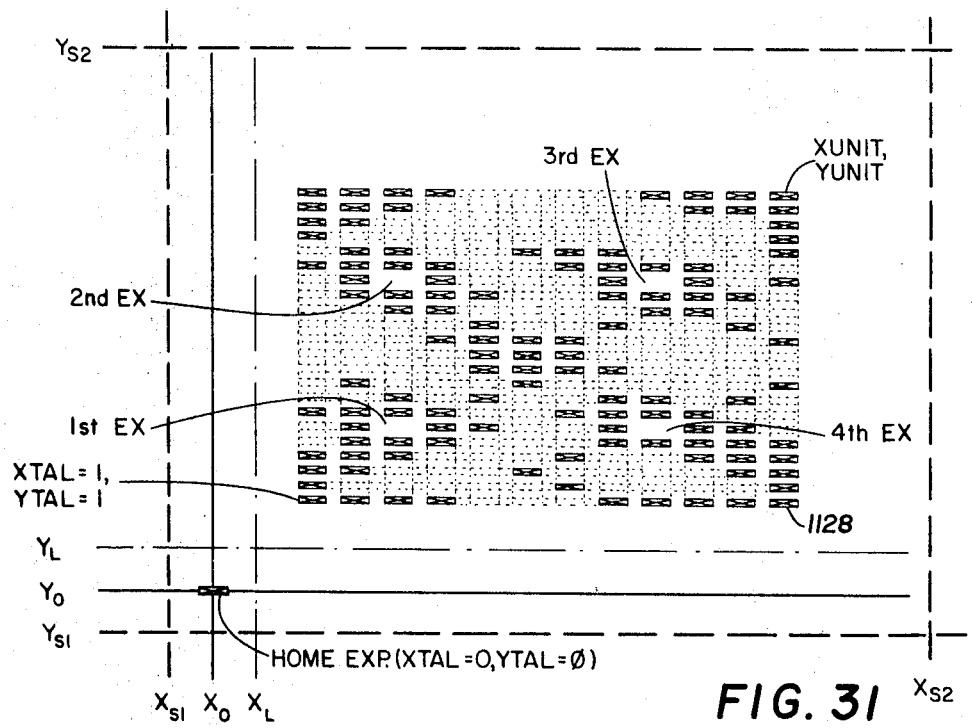
FIG. 31 is a schematic diagram which serves to illustrate the operation of the step and repeat camera of FIG. 1.
Figure 10:
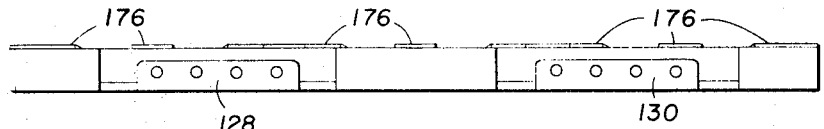
FIG. 10 is a rear end view of the carrier of FIG. 9.
Figure 9:
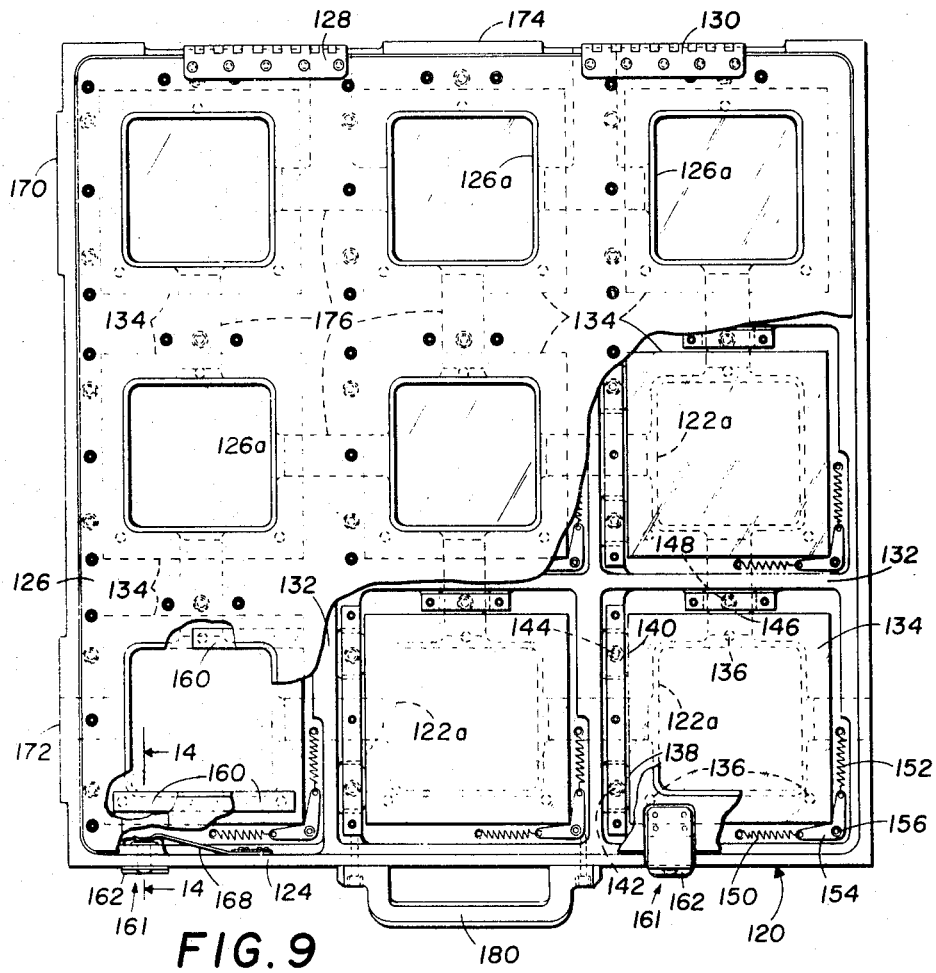
FIG. 9 is a plan view, partially broken away to show details of construction, of a multiple plate carrier for the camera of FIG. 1.
Figure 11:
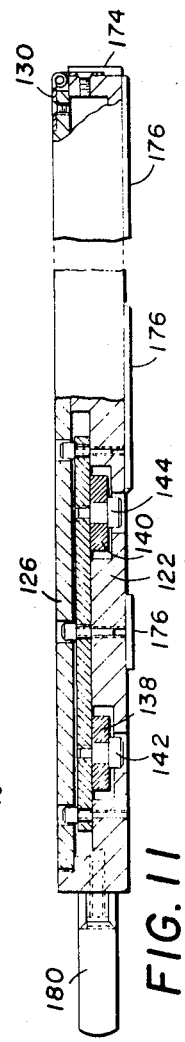
FIG. 11 is a side view of the carrier of FIG. 9, partially broken away to show details of construction.
Figure 12:
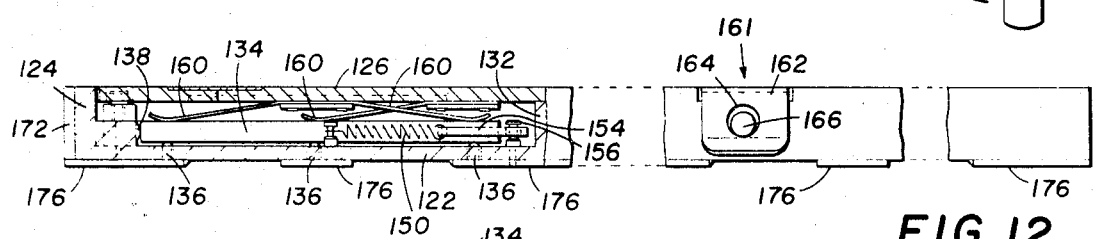
FIG. 12 is a front end view of the carrier of FIG. 9, partially broken away to show details of construction.
Figures 13, 14:
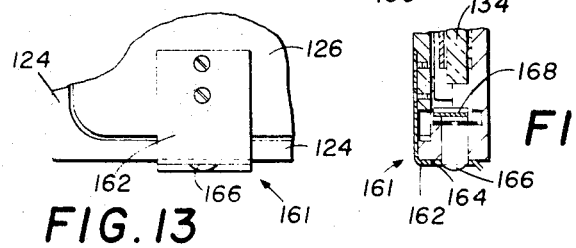
FIG. 13 is an enlarged plan view of one corner of the carrier of FIG. 9.
FIG. 14 is an enlarged sectional view taken substantially on lines 14—14 of FIG. 9.

FIG. 31 is a geometric representation of the field of movement of the table 26 relative to the granite block 18 and therefore relative to the image projection system. Lines $Y_0$ and $X_0$ represent the positions of the table 26 at which the X and Y origin detectors send the X and Y origin interrupt signals to the computer. Lines $X_L$ and $Y_L$ represent the positions at which the X and Y status lines change from positive to negative, and are spaced about thirty micro inches from $X_0$ and $Y_0$, respectively. Lines $X_S$ and $Y_S$ represent the points at which the table strikes mechanical stops to limit travel of the table and activates limit switches which automatically shut down operation of the system. Similar safety limit switches and mechanical stops (not illustrated) are also provided at the other two boundaries of the field of travel.

The computer 570 is programmed as illustrated in the basic flow charts of FIGS. 32a and 32b, and in the subroutine charts of FIGS. 33–41. When the computer receives one of the four interrupt signals indicated in FIG. 28, it immediately proceeds into a predesignated subroutine and then returns to the point of exit in the program when the subroutine is completed. All other inputs to the computer are in the form of status lines which must be read by the computer at a specified point in the program.

When first set in operation, the computer 570 proceeds through a diagnostic subroutine 700 during which the computer performs various self-checking operations to insure that it is operating properly. Next, all interrupts except power failure are disabled at 702. Then the typewriter interrupts are set up at 704, and the flags and words initialized at 706.

The computer then operates the readout typewriter at 708 to identify the program the computer is following, and then types out the instruction to load the format tapes at 710. The format tapes are then read into the computer by the tape reader and stored at 712. The computer then proceeds through the diagnostic subroutine at 714, and checks all status lines at 716. If the EXIT flag is set at 718 as a result of manually pushing the EXIT button, the computer goes into an EXIT subroutine 720 to leave the program. If the EXIT flag is not set, the status of the HOME button is checked at 722. If the HOME button has not been pushed, the program returns to the diagnostic subroutine 714. Once the HOME button has been manually pushed, the computer proceeds through HOME subroutine 726 which is set out in detail in FIG. 35.

At the start of the HOME subroutine illustrated in FIG. 35, the table may be at any position within the field defined by stops $X_{s1}$, $X_{s2}$, $Y_{s1}$ and $Y_{s2}$, so that the limit switches $X_L$ and $Y_L$ may be either on or off. Therefore, the table is first moved into the first or positive quadrant. Thus, the status of limit switch $X_L$ is checked at 728. If the limit switch is on, the velocity of the table is compared to 10% of the design velocity by a velocity measuring subroutine 730. The velocity measuring subroutine involves reading the X counter, waiting a predetermined number of microseconds, and reading the counter again. If the difference in the counts is greater than a predetermined number, the X velocity is greater than 10% of the design velocity. If the velocity is greater than +10% of the design velocity at 732, the status of limit switch $X_L$ is again checked at 728. If, however, the X velocity is less than 10% of the design velocity, or is negative, then the X drive motor is set at +100% of the maximum design force at 734, the computer waits a predetermined number of microseconds at 736, and then the X drive motor is set back to zero at 738. Then the status of limit switch $X_L$ is again checked at 728. Once limit switch $X_L$ is off, indicating that the table is in the positive X area, the X motor is set to zero at 740.

The computer then proceeds to check the status of limit switch $Y_L$ at 742. If limit switch $Y_L$ is on, the Y velocity is measured at 744 and compared with +10% of the design velocity at 746. If the velocity is greater than +10%, the status of limit switch $Y_L$ is again checked at 742. If the Y velocity is not greater than +10%, or is negative, the Y motor is set to +100% force at 748, the computer waits for a predetermined number of microseconds at 750, and the Y motor is set to zero at 752 before again checking the status of limit switch $Y_L$ at 742. Once the limit switch $Y_L$ is off, the Y axis drive motor is set to zero at 754. The table is then in the positive quadrant defined by axes $X_L$ and $Y_L$ in FIG. 33.

The status of the signal from limit switch $X_L$ is once again checked at 756. If limit switch $X_L$ is off, as will normally be the case, the X velocity is measured at 758 and compared with −10% of the design velocity at 760. If the X velocity is not les than −10%, the X drive motor is set to −100% at 762. The computer then waits for the predetermined number of microseconds at 764, and sets the X drive motor to zero at 766. The computer then proceeds to check the status of limit switch $Y_L$ at 768. On the other hand, if limit switch $X_L$ is on at 756, the X drive motor is set to zero at 770 before proceeding to check the status of limit switch $Y_L$ at 768. Also, if the X velocity is already less than −10% at 760, the computer proceeds to check the status of limit switch $Y_L$ at 768 without pulsing the X motor with a force of −100%. If limit switch $Y_0$ is not on at 768, the Y velocity is measured at subroutine 772 and compared to −10% at 774. If the Y velocity is not less than −10% of the design velocity, the Y motor is set to a force of −100% at 776, the computer waits a predetermined period at 778, and again sets the Y motor to zero at 780 before returning to check the status of limit switch $X_L$ at 756. If the Y velocity is less than −10% at 774, the Y motor is not pulsed. Instead the status of limit switch $X_L$ is checked at 756. This routine of checking the status of limit switch $X_L$ at 756, pulsing the X motor when required to maintain velocity, checking the status of limit switch $Y_0$ at 768, and pulsing the Y motor where required to maintain velocity is repeated until limit switch $Y_0$ is turned on. Then the Y motor is set to zero at 782 and the status of limit switch $X_0$ again checked at 784. If limit switch $X_0$ is not yet on, the X velocity is again measured at 786 and compared to −10% of the design velocity at 788. If the X velocity is not less than −10%, the X motor is again set to −100% at 790, the computer waits for the predetermined period at 792, and then sets the X motor back to zero at 794 before returning to check the status of limit switch $X_0$ at 784. If the X velocity is less than −10% of the design velocity at 788, the X motor is not pulsed. Instead, the status of the limit switch $X_0$ is immediately checked again at 784. Once the limit switch $X_0$ has been turned on, the X motor and Y motor brakes are set and the computer returns to the main program illustrated in FIG. 32a and types out "specify format" at 796.

The status lines are then checked at 798 and if the EXIT button has been pushed at 800, the EXIT routine 720 is followed to place the system in a standby status. If the EXIT button has not been pushed, all interrupts are inhibited at 802 with the exception of the power failure interrupt. A four digit format number is read into the computer from the typewriter at 804, and then the interrupts again enabled at 806. The four digit format number is checked at 808 to see if it is legal. If it is not legal, then the number is checked at 810 to see if it is special format. If the number is not special, the typewriter types error at 812, and returns to type "specify format" at 796. If, however, the number is special, the special flag is set at 814 and then the computer proceeds to type out "ready to run" at 816. If the number is legal, the format data is transferred to the appropriate address M, N, XSPAC, YSPAC in the memory and then the notation "ready to run" is typed out.

Next, the computer proceeds through the diagnostics subroutine at 818 and checks the status of the run button at 820. If the run button has not been pushed, then the status of the special flag is checked at 822. If the special flag is not set, then the program returns to the diagnostic subroutine 818 and this cycle repeated until the run button has been pushed. If the special flag has been set, then the status of the index button is checked at 824. If the index button has not been pushed, then the program returns to the diagnostic subroutine 818 until the index button has been pushed.

After the run button has been pushed in the case of a normal format, or the index button pushed in the case of a special format, the computer increments the run number tally and types out the run number at 826. The barometric pressure measured by gauge 600 is read and the pressure typed out at 828 before proceeding to initialize the table by subroutine 830 which is shown in detail in FIG. 34.

Figure 33:
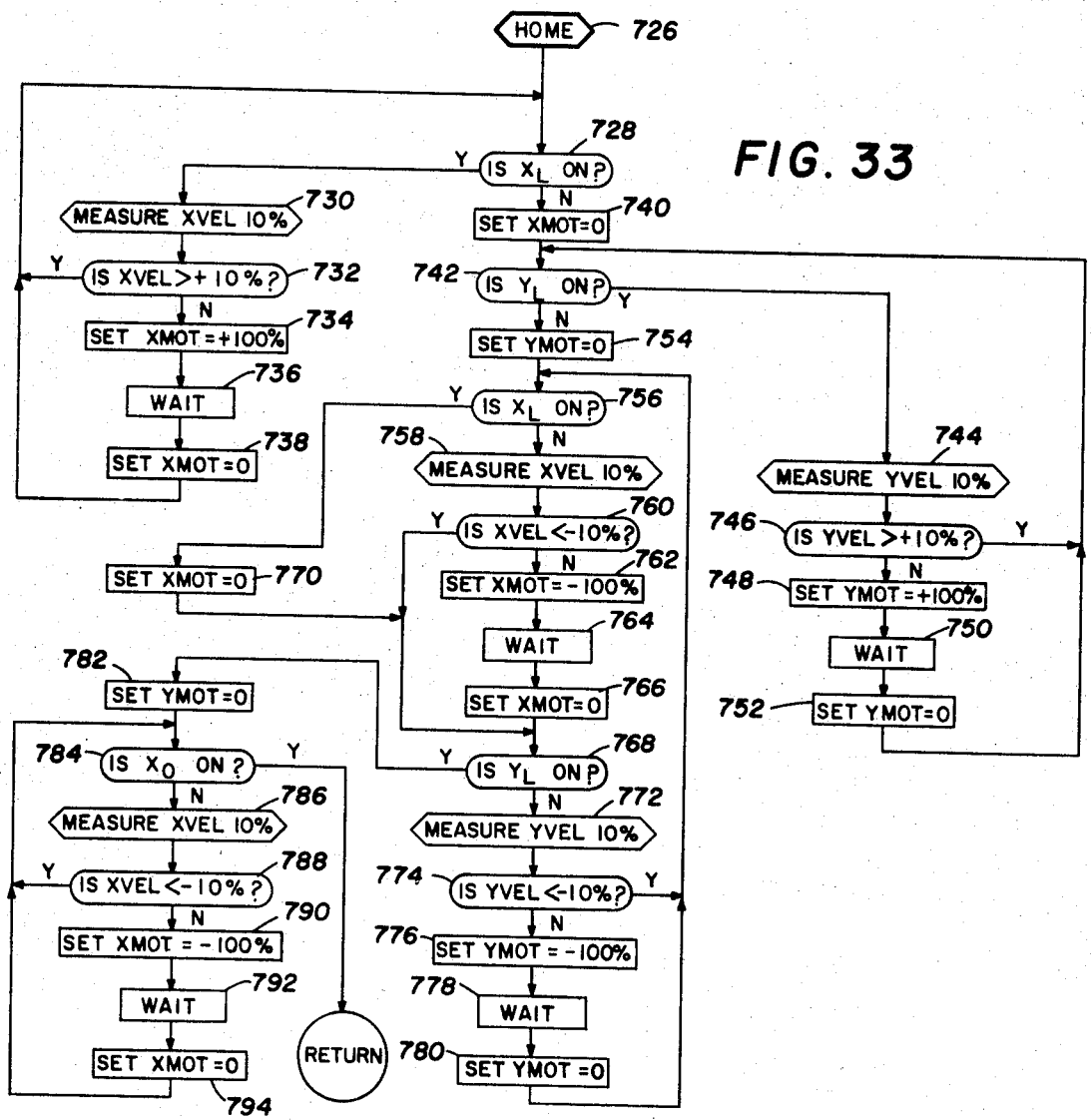
Figure 39:
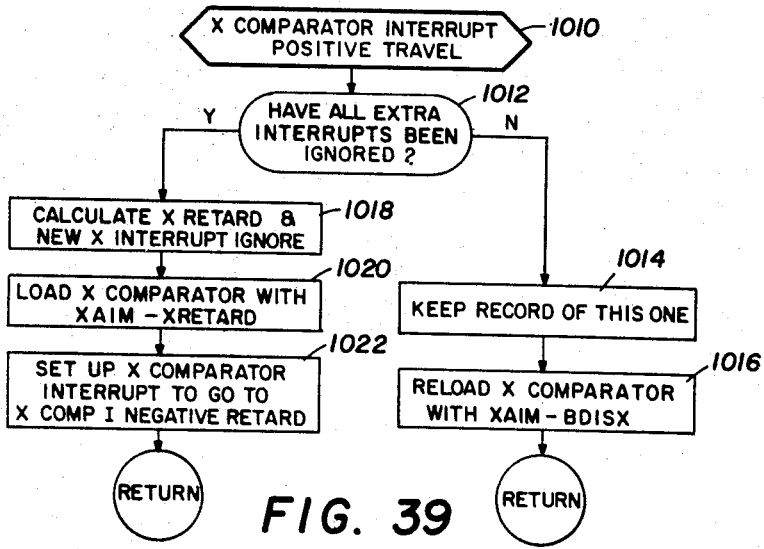
Figure 34:
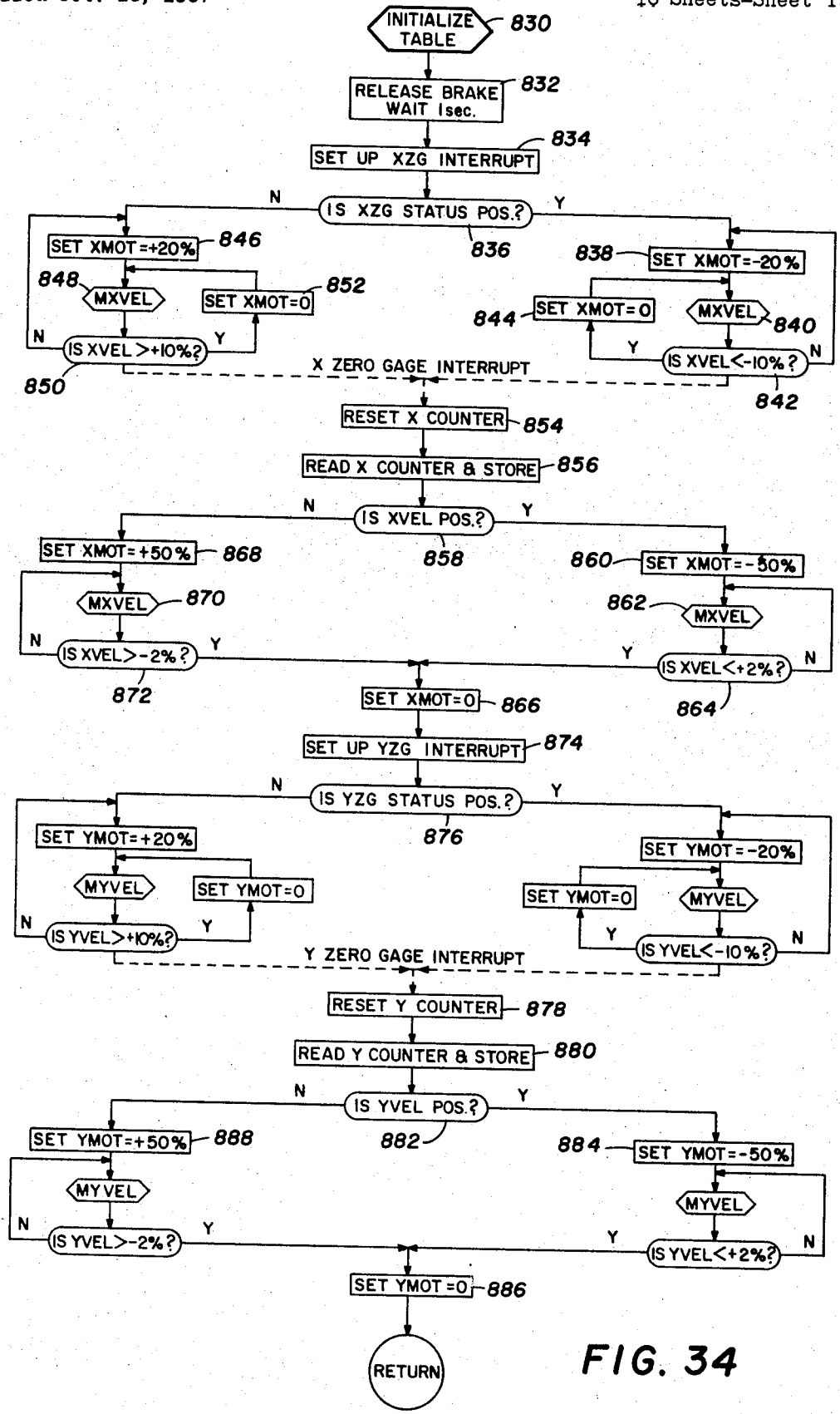

As a result of the HOME subroutine 726, the table was positioned in the general vicinity of the zero gauges 585 and 587 which are represented in FIG. 33 by $X_0$ and $Y_0$, and the X and Y drive motor brakes 96 and 110 were set. The table is initialized by the subroutine illustrated in FIG. 34 by first releasing the X and Y drive motor brakes at 832. This takes about one second during which time the computer waits. Then the $X_0$ gauge interrupt is set up at 834 and the status of the $X_0$ gauge checked at 836. If the $X_0$ gauge status is positive, indicating that the table is to the right of line $X_0$ in FIG. 33, the X motor is set to −20% of design force at 838, and the X velocity measured at 840 and compared to −10% of the design velocity at 842. If the X velocity is less than −10% of the design velocity, the X motor is set to zero force at 844 and the velocity again measured at 840. If the X velocity is not less than −10% of the design velocity at 842, however, the X motor is again set to −20% at 838 before measuring the velocity at 840. If the $X_0$ gauge status is not positive at 836, the same procedure is repeated except that the X motor is set to +20% of design force at 846, and the velocity measured at 848 and compared with 10% of the design velocity at 850. If the X velocity is greater than +10%, the X motor is set to zero at 852. If the X velocity is not greater than +10%, the X motor is maintained at +20%.

In either case, the table is moved toward the zero reference point $X_0$ at about 10% of the design velocity. As the table moves past the zero reference point $X_0$ in either the positive or negative direction, the X origin interrupt from detector 593 occurs and is fed to the priority interrupt module 588 of the computer 570. The X axis fringe counter 566 is immediately reset at 854 upon receipt of the X origin interrupt signal. As previously discussed, all bits of the counter can be reset except the least three significant bits, which are read and stored at 856. The direction of travel of the table in the X coordinate direction is determined at 858. If the X velocity is positive, the X motor is set to −50% of design force at 860 in order to stop the table. The X velocity is then measured at 862 and the measured velocity compared to +2% of the design velocity at 864. If the X velocity is less than +2% of the design velocity, the X motor is set to zero at 866. If the X velocity is not less than +2% of the design velocity, the velocity is again measured at 862 and the cycle repeated until the X velocity is less than +2% of the design velocity. If on the other hand the X velocity is negative at 858, the X motor is set to +50% of design force at 868, and the velocity measured at 870 and compared with −2% of design velocity at 872. If the X velocity is less than −2% of the design velocity, the velocity is again measured at 870. However, if the X velocity is less than −2% of the design velocity at 872, the X motor is set to zero at 866. Once the X velocity has reached a speed less than 2% of the design velocity, friction will quickly bring it to a halt in the absence of a force exerted by the X motor.

Next, the $Y_0$ gauge interrupt or Y origin interrupt is set up at 874. The same procedure is then repeated to reset the Y axis fringe counter 568. First the $Y_0$ gauge status is determined at 876. If the tables is at a positive Y position, the Y motor is set to —20% to slowly move the table in the negative direction at about 10% of the design velocity until the Y origin interrupt is produced by the Y origin detector. If the table is in a negative position relative to the zero axis $Y_0$, then the Y motor is set to +20% and the table moved at about +10% of design velocity until the Y origin interrupt occurs. When the Y origin interrupt occurs, the Y counter is reset at 878 and the three least significant bits read and stored at 880.

Then the table is brought to a stop in the Y direction by first determining if the Y velocity is positive at 882. If the Y velocity is positive, the Y motor is set to —50% at 884 until such time as the Y velocity is reduced to less than +2% of the design velocity. Then the Y motor is set to zero at 886 to stop the table. On the other hand, if the Y velocity is negative at 882, the Y motor is set to +50% force at 888, and this force is maintained until the Y velocity becomes greater than —2% of the design velocity. Then the Y motor is set to zero at 886. The X and Y fringe counters are then reset and the table is said to be "initialized," and the computer returns from the subroutine of FIG. 34 to the master program of FIG. 32a as the X and Y brakes are set.

The special flag is then checked at 890. If a special format has not been specified, the format number is typed out at 892. Then the width of the array (X axis) in inches is typed out, and the height of the array (Y axis) in inches is typed out at 894, followed by the spacing between the centers of the exposures in the X and Y directions at 896. Then the format is calculated at 898 at which time the number of exposures required, the number of rows and columns required, and the location of blank exposures at which the alignment marks will subsequently be exposed are determined. The computer then types out the number of exposures required at 900, and calculates the first exposures at 902. The brakes are released at 904 and the exposure tally EXPOD set to —2 because an exposure is made at HOME before proceeding to expose the array, and then a final exposure is made at HOME after all of the exposures of the array are made so that any offset between the two HOME exposures will indicate the cumulative error for the run. Then XOLD, YOLD, XNEW and YNEW are all set to zero at 907–910. XOLD and YOLD are the coordinate locations of the last exposure expressed in milli inches from HOME (which is $X_0, Y_0$), and XNEW and YNEW are the coordinates of the next exposure expressed in milli inches from HOME. XTAL is then set to zero and YTAL set to one to define the HOME exposure position.

The computer then moves into the subroutine 912 to calculate the fringe count, position the table, and make the exposure, the subroutine being shown in detail in FIG. 35. Referring to FIG. 35, the status lines and flags are checked at 914 and 916, then XAIM and YAIM are calculated at 918. Since XAIM and YAIM are the number of fringe counts from the zero reference point in the X and Y directions, the barometric pressure read at 828 is taken into consideration in the calculation. For the first exposure at HOME, XAIM and YAIM will be the numbers read and stored from the last three digits of the counters. Next, XNEW is compared to XOLD at 920. Since XNEW and XOLD were both set to zero, the two are equal so the program proceeds directly to point POSY along line 922. YNEW is then compared with YOLD at 926. Since YNEW and YOLD were both set to zero, the program proceeds directly to the positioning during exposure subroutine 930 along line 928. Subroutine 930 is hereafter described in detail.

Figure 36:
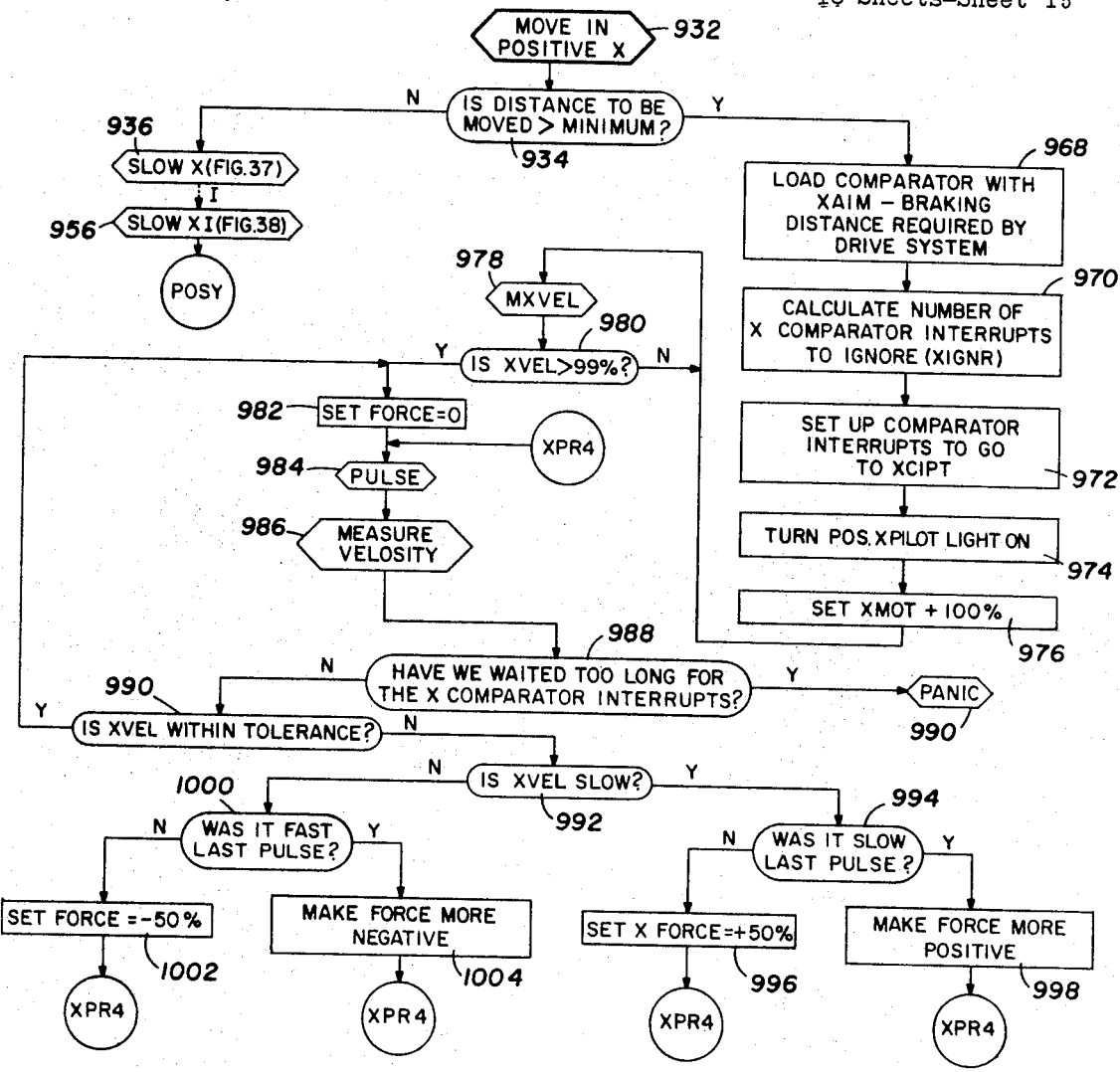
Figure 40:
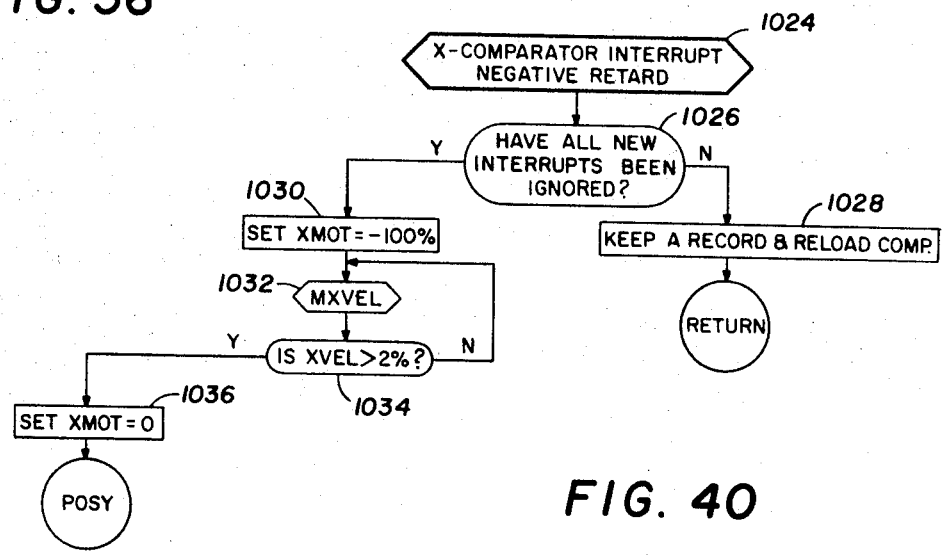

If on the other hand XNEW is greater than XOLD at 920, as will normally be the case for all exposures other than the first HOME exposure, the computer moves into the subroutine 932 which is shown in FIG. 36, for moving the table in the positive X direction. First the distance to be moved is compared to the minimum distance practical for moving the table at high speed at 934. If the distance is less than the practical minimum for high speed, the computer moves into subroutine 936 which is designated "SLOW X" and which is illustrated in detail in FIG. 37. In the SLOW X subroutine, the X comparator 580 is loaded with XAIM and the X counter 566 read at 938, and XAIM compared with the present X coordinate at 940. If XAIM is greater than the present X coordinate, the X drive motor is set to +20% of design force at 942 to begin moving the table very slowly in the positive X direction. Then the X velocity is measured at 944 and the measured X velocity compared with 10% of the design velocity at 946. If the X velocity is equal to or less than 10% of the design velocity, the X motor is set to zero force at 948, but if the table has not yet reached +10% of design velocity, the X motor is again set to +20% at 942 and the procedure repeated to maintain the X velocity at about +10% of design velocity. On the other hand, if XAIM is less than the present X coordinate, the X motor is set to —20% at 950 to move the table in the negative X direction. Then the X velocity is measured at 951 and the measured velocity compared to —10% of the design velocity at 952. If the table has reached —10% of the design velocity, the X motor is set to zero at 954, and the velocity again measured at 950 to repeat the cycle. If, however, the table has not yet reached 10%, or is below 10% at 952, the X motor is set to —20% at 950 and the cycle repeated. The table is thus moved at approximately —10% of the design velocity toward XAIM.

When the table reaches XAIM, the X comparator 580 generates the X comparator interrupt signal which immediately causes the computer to go to the SLOW X interrupt subroutine 956 where it is first determined whether the X velocity is positive or negative at 958. If the X velocity is positive, the X motor is set to —50% of design force at 960 and the X velocity measured at 962 and compared with ±2% of the design velocity at 964. If the velocity is not less than 2%, the velocity is measured again. Once the X velocity is less than 2%, the X motor is set to zero at 966. On the other hand, if the X velocity is negative, the X motor is set to +50% at 968, the velocity measured at 970, and the measured velocity compared to —2% of the design velocity at 972. If the velocity has not slowed to a value greater than —2%, the X velocity is again measured at 970. Once the X velocity has slowed to a value greater than —2%, the X motor is then set to zero at 966 and the computer returns to point POSY in FIG. 35.

Still referring to FIG. 36, if the distance to be moved is greater than the minimum distance practical to move at high speed at 934, the X fringe count comparator 580 is loaded at 968 with XAIM minus the braking distance required to stop the table when the table is traveling at 102% of the design velocity. A comparator interrupt will occur approximately every 0.0064 inch due to the twelve bit capacity of the comparator. Since the distance to be moved will typically be on the order of 0.100 to 0.200 inch, the number of X comparator interrupts which must be ignored (XIGNR) is calculated and stored at 970. The program is then set up to go to the X comparator interrupt positive travel subroutine at 972 upon the occurrence of the X comparator interrupt. The positive X panel light is then turned on at 974 to indicate that the table is moving in the positive X direction, and the X motor is set to the maximum accelerating force of +100% at 976.

The X velocity is measured at 978 and the measured velocity compared with 99% of the design velocity at 980. If the X velocity has not yet exceeded 99% of the design velocity, then the velocity is measured again at 978 and compared at 980 until the X velocity does exceed 99% of the design velocity. Then the force of the X motor is set to zero at 982. The program then proceeds into a pulse subroutine 984 which involves loading the digital analog converter with the desired force, waiting for a predetermined period, then loading the digital analog converter with zero force, and waiting for another predetermined period.

The X velocity is then measured at 986, and the elapsed time since the last X comparator interrupt compared with a predetermined maximum period at 988. If it has been too long since the last comparator interrupt, a malfunction is assumed and the computer goes into a PANIC subroutine 990 which terminates operation of the system and applies the brakes to stop the table. If it has not been too long since the last comparator interrupt, the X velocity measured at 986 is compared with selected tolerances, typically ±2% of the total design velocity. If the velocity is within tolerance, the X force is set to zero at 982 for the next pulse subroutine 984. If the X velocity is not within tolerance, however, it is determined whether the velocity is slow or fast at 992. If the X velocity is slow, it is determined whether the X velocity was slow during the last pulse at 994. If the velocity was not slow during the last pulse, the force is set to +50% at 996 before returning to the pulse subroutine 984 through reference point XPR4. If the velocity was slow during the last pulse, however, the force is made more positive by a predetermined increment at 998 prior to returning to the pulse subroutine 984. If the X velocity was determined to be slow at 992, it is determined whether the velocity was fast prior to the last pulse at 1000. If the X velocity was not fast prior to the last pulse, the X force is set to −50% at 1002, but if the X velocity was fast during the last pulse, the X force is made more negative at 1004 by the predetermined increment before returning to the pulse subroutine 984. Thus, the table is moved in the positive X direction substantially at the design velocity. If the velocity of the table either exceeds or falls below the design velocity by a specified tolerance, negative or positive pulses, respectively, are applied to bring the velocity back within the specified tolerance, and successive pulses in the same direction are increased in magnitude until the desired velocity is achieved.

As the table is moved in the positive X direction, an X comparator interrupt occurs about every 6.4 milli inches. Each time that a comparator interrupt occurs, the computer leaves subroutine 932 and goes to the X comparator interrupt positive travel subroutine 1010 as shown in FIG. 35. In subroutine 1010, which is shown in detail in FIG. 39, it is first determined at 1012 whether all extra interrupts (XIGNR), as previously calculated at 970, have been ignored. If the number of interrupts to be ignored have not occurred, then the register keeping track of the number of interrupts which have occurred is incremented at 1014, the X comparator reloaded with the XAIM minus the braking distance at 1016, and subroutine 932 resumed at the point where the X comparator interrupt occurred.

On the first comparator interrupt after the proper number of interrupts have been ignored, the point at which a retarding force is to be applied to the retard table is calculated in fringe counts from home at 1018. This calculation is based on the velocity of the table at the time the calculation is made. The number of interrupts which must be ignored to get to the retard point is also calculated and stored. The X fringe count comparator 580 is then loaded at 1020 wtih the calculated XAIM minus XRETARD, and the computer set up to go to the X comparator interrupt negative retard subroutine 1022 on the occurrence of each comparator interrupt. Then when the next X comparator interrupt occurs, the computer moves into the X comparator interrupt negative retard subroutine 1024 which is shown in detail in FIG. 42 to which reference should now be made. The subroutine 932 to move the table in the positive X direction is continued. However, each time a comparator interrupt occurs, the computer now goes to subroutine 1024, rather than to subroutine 1010. When each interrupt occurs, the count in the register keeping track of the interrupts which have occurred is compared to the number of interrupts to be ignored at 1026. If all interrupts to be ignored have not yet occurred, the register keeping track of the interrupts is incremented and the X comparator reloaded at 1028.

After all of the new interrupts have been ignored, the X motor is set to −100% at 1030 after the next comparator interrupt and the X velocity repeatedly measured at 1032 and compared with +2% of the design velocity at 1034 until the velocity of the table falls below +2%. Then the X motor is set to zero at 1036, and the computer then proceeds to POSY in FIG. 35.

In the event XNEW is not greater than XOLD at 920, the computer moves into subroutine 1038 to move the table in the negative X direction. Subroutine 1038 is identical to subroutine 932, except that the forces are reversed to produce table movement in the negative direction. When each X comparator interrupt is received, the computer moves to the X comparator interrupt negative travel subroutine 1040, which is identical to subroutine 1010 except for the direction of travel, until all of the required comparator interrupts have occurred. The computer then goes to X comparator interrupt positive retard subroutine 1042, which is identical to subroutine 1024 except for the direction of the retarding forces, upon receipt of subsequent comparator interrupts until the table is slowed to greater than −2% of the design velocity near XAIM.

From point POSY, the program then moves into the portion of the subroutine for moving the table from YOLD to YNEW which is identical to the program for moving the table from XOLD to XNEW. Thus, subroutines 1044, 1046, 1048, 1050, 1052 and 1054 are identical to subroutines 932, 1010, 1024, 1038, 1040 and 1042, respectively, execpt that the subroutines are applicable to movement along the Y axis.

Thus, when the table 26 is to be moved substantial distances, it is first accelerated in the appropriate X direction by applying a continuous maximum design force until the table is accelerated to 100% of the design velocity. The maximum force is then terminated and the table maintained within ±2% of the design velocity by a series of impulses acting in the proper direction. The computer has the capability of measuring the velocity and computing the corrective force required at a much greater rate than the drive system can respond. The drive system also has a friction force which varies appreciably over its travel. If a corrective force is continuously applied to the table, these factors combine to make the system highly unstable and uncontrollable. The frequency, duration, and magnitude of the impulses can be selected by empirical methods to provide a stable drive system capable of maintaining the velocity of the table substantially with the specified tolerances. However, even if the velocity of the table is maintained within ±2% of the design velocity, the table would often be brought to rest a substantial distance from XAIM if the maximum retarding force were applied to the table at the same distance from XAIM each time. For this reason, the point at which the maximum retarding force should be applied to stop the table at XAIM is calculated based on the velocity of the table just before the table reaches the last point at which the force could be applied and still stop the table at XAIM if the table were traveling at the maximum expected velocity, i.e., 102% of design velocity.

Once the table is retarded to less than 2% of the design velocity in both the X and Y coordinate directions, and the X and Y drive motors have been set to zero force, the computer moves into the positioning during exposure subroutine 930 shown in FIG. 41. First the status lines and flags are checked at 1060 and 1062. Then the status line for the pause button is checked at 1064. If the pause button is pushed, the program delays until the pause button is released. Then the X and Y positive and negative tolerances which are to define a good exposure are set up, and the computer is set up to use the average position of the table when computing the necessary restoring force at 1066, if desired. The status lines and flags are again checked at 1068 and 1070. If the single flag has not been set at 1072, the computer proceeds to read the X and Y counters and store the numbers in the X and Y registers at 1074. If position averaging is being used, the averages are also updated at 1074.

Next, XAIM is compared with XAVERAGE at 1076 to determine the average position of error E and a restoring force XFORC calculated according to curve 1075 in FIG. 42. If XAIM is greater than XAVERAGE, then a positive restoring force F is calculated at 1078 according to the equation $F=k(E)^n+F_f$, where $k$ is a constant, E is the absolute value of the difference between XAIM and XAVERAGE, $n$ is a positive number, and $F_f$ is the force required to overcome friction. This force is represented by the portion of the curve designated 1075*a*. If XAIM is less than XAVERAGE, the force is calculated in the same manner at 1080, except that it is given a negative sign. This force is represented by the portion of the curve designated 1075*b*. Then the same procedure is followed for the Y axis by comparing YAIM with YAVERAGE at 1082 and then calculating the positive or negative force required to move the table in the direction of YAIM at 1084 and 1086, respectively. If the error E exceeds predetermined maximums $\pm E_m$, the force is reduced to the constant value sufficient to overcome friction $F_f$ and move the table at a slow velocity regardless of the magnitude of the error E. This force is represented by the portion of the curve designated 1075*c* and 1075*d*. It is necessary to provide a sharply increasing force as the error increases in order to maintain the table positioned with the desired tolerance. In general, the value of $n$ should be increased as the response time of the drive system increases in order to maintain the table positioned within a given tolerance. However, if the force were to be maintained at a high maximum value over extended distances from XAIM, the high restoring force would accelerate the table to such speeds that a relatively slowly responding drive system cannot stop the table after it has passed XAIM by a considerable distance, and each time the overshoot tends to increase, resulting in an unstable condition. But if the restoring force is reduced to a low value after the error has exceeded selected limits, the table will never be accelerated to a velocity so great that the restoring force in the regions 1075*a* and 1075*b* cannot reverse the travel of the table before the limit is again exceeded and the restoring force reduced.

After the restoring forces are calculated, the X motor is set to the X force and the Y motor is set to the Y force at 1087. Next, the position of the table on the X axis is compared with XAIM at 1088 to determine if the table is within the selected tolerance. If the table is outside tolerance, the register recording the number of errors is incremented at 1090. If the table is within tolerance, then the position of the table on the Y axis is compared with the XAIM at 1092. If the position of the table on the Y axis is out of tolerance, the error tally is incremented at 1090. If the table is within tolerance on the Y axis, the "Within Tolerance" tally is incremented at 1094, and this number compared with a selected minimum number at 1096. If the tolerances have not been met the selected number of times to indicate that the table is stabilized at XAIM and YAIM within the desired tolerances, the status of the "exposure finished" line is checked at 1098. If the exposure is not finished, and at this point has not even been started, the computer returns to checks the stats at 1068 and then proceeds to repeat the routine.

After the tolerances have been met the required number of times to indicate that the table has stabilized at XAIM and YAIM, the error tally is initiated at 1100, and the blank flag checked at 1102. If the blank flag is set, then the status line from the manual expose button is checked at 1104. If the expose button is not pushed, then the computer returns to check the stats at 1068 through exposure finished status check 1098. However, if the blank flag is not set, or if the expose button has been pushed when the blank flag is set, the lamps are turned on at 1106, then the status of the exposure finished line checked at 1098. The positioning during exposure subroutine 930 then continues to read the X and Y counters, compute the X and Y restoring forces necessary to maintain the table positioned at XAIM and YAIM, compare the position of the table with XAIM and YAIM to determine if the table is positioned within the desired tolerances, and keep a tally of the times when the table is within or without the desired tolerance until the exposure is finished. The length of the exposure is timed by a mechanical timing device and will depend upon the intensity of the light source and the emulsion being used, and may vary from a few seconds down to only a small fraction of a second. When the exposure is finished, the X and Y drive motors are set to zero at 1108 and the number of errors calculated at 1110 before returning to the subroutine illustrated in FIG. 35, and thus to the primary program in FIG. 32*b*.

After the first exposure at HOME, XTAL is incremented by one at 1120 so that both XTAL and YTAL equal one, thus defining the first exposure of the array shown in FIG. 33 in terms of column and row. A check is made to see if this is one of the four exceptions by checking the blank flag at 1122. If it is not an exception, then the coordinates of the exposure are calculated in milli inches from home at 1124 before moving into the "calculate" fringe count, position and expose subroutine of FIG. 34 at 1126 heretofore described in detail.

After the exposure is complete, XTAL is compared to XUNIT at 1128, where XUNIT is defined as the total number of exposures in each row. If XTAL is not equal to XUNIT, then YTAL is incremented by one at 1120. This procedure is followed until all exposures in the row XTAL=1 are completed at which time XTAL=XUNIT. If the exposure defined by XTAL and YTAL is one of the four exceptions and is not to be exposed, subroutines 1124 and 1126 are omitted. When XTAL=XUNIT at 1128, indicating that all of the exposures in the row have been completed, the YTAL is compared with YUNIT at 1130. If YTAL is not equal to YUNIT, then YTAL is incremented by one at 1132 before proceeding to check for an exception at 1134. Then the coordinates of the new exposure are calculated at 1136 before moving into the calculate fringe count, position and expose subroutine at 1138. After the exposure, if XTAL is not equal to one at 1140, then XTAL is decremented by one at 1142. The successive exposures back along the second row are made in this manner until XTAL is finally equal to one at 1140. If any exceptions are encountered at 1134, subroutines 1136 and 1138 are omitted. After the exposure where XTAL=1, YTAL is compared to YUNIT at 1146 and if the two are not equal, YTAL is incremented by one at 1144 before returning to check the blank flag at 1122. As a result of this routine, the table is moved from left to right across the first row, back across the second row, and then back across the third row, etc., until either XTAL=XUNIT at 1128 and YTAL=YUNIT at 1130, or XTAL=1 at 1140 and YTAL=YUNIT at 1146. Then the blank flag is struck at 1148, and the table is returned to HOME and exposed by subroutine 1150 which is essentially the same as the subroutine shown in FIG. 35 to calculate fringe count, position, and expose, except that XAIM and YAIM are merely the stored values of $X_0$ and $Y_0$. After the second exposure at HOME, any major cumulative error will be indicated by a failure of the two home exposures to coincide.

After the second home exposure, the computer types out "ready for exceptions" at 1152 and pauses until the run button is pushed at 1154. This gives the operator time to replace the master transparencies used to make the exposures of the array with the master transparencies for the reference patterns to be placed at the four exceptions. Then the table is again initialized at 1156 by the subroutine shown in FIG. 34. Then XTAL AND YTAL are set at 1158 to specify the column and row of the first exception and the coordinates of the first exception calculated at 1160 in milli inches from HOME. Then the exposure is made at 1162 using the calculate fringe count, position and exposure subroutine of FIG. 35. XTAL is then set to the second exception at 1164, the coordinates of the second exception calculated at 1166, and the exposure made at 1168. The YTAL is then set to the column of the third exposure at 1170, the coordinates calculated at 1172 and the exposure at the third exception made at 1174. The XTAL is then set to the fourth exception at 1176, the coordinates calculated at 1178, and the fourth reference mark exposure made at 1180. The blank flag is then reset at 1182 and the table returned to zero at 1184 before typing "run complete" at 1186. The program then returns to point cc of FIG. 32a and proceeds with the next programmed run, unless the EXIT flag is set.

In the event a special format is programmed, the special flag will be set at 890 in FIG. 32a. The special format permits the table to be positioned at a series of coordinates designated on a punched tape. Thus, the first step of the special format routine is to turn on the tape reader at 1200, set the exposure tally EPOD to zero at 1202, and set XOLD=YOLD=250 milli inches at 1204. This references the first exposure to a point about 250 mils from the origin, i.e., $X_0$ and $Y_0$. The computer then types out the special format and the column and row of the exposure at 1206 before checking the tape reader at 1208. An eight bit character defining the X coordinate of the exposure is then read into XNEXT at 1210. Then a check is made to see if the end of the file has been reached at 1212, before reading an eight bit character from the tape defining the Y coordinate of the exposure into YNEXT at 1214. XNEXT is then converted to mils and stored in XNEW at 1216, and YNEXT is converted to mils and stored in YNEW at 1218. The exposure is made at 1220 by the calculate fringe count, position and expose subroutine of FIG. 35.

Each successive exposure is made by repeating the routine beginning at 1210 until the end of the file is detected on the tape at 1212. Then the blank flag is again set at 1222, the table returns to zero at 1224 and the computer types out "run complete" at 1226 before returning to point cc in the program.

SUMMARY OF OPERATION

In order to set the camera 10 up for operation, the appropriate lenses are placed in the holders of the lower stage 34. Reduction lenses of from five to twenty power are typically used. The bellows 40 may be raised to the positions shown in FIG. 22 by operating the motor 509 in a direction to raise plates 501 and 503. The lower stage 34 may be adjusted to the proper height above the table 26 by operating the drive motor which drives the perforated steel band 472 to rotate the ball-screw sprockets 462 and 464. First one end of the lower stage 34 is precisely set at the appropriate height by using, for example, the optical sighting instrument 484 and the calibrated rod 310, then brake 480 at that end set. The other end of the lower stage is then set at the appropriate height by pulsing the drive motor then setting brake 482 to securely lock the stage 34 in a precisely horizontal plane. The linear bearings 466 and 468 which engage guide rods 306 and 322 at diagonally opposite corners of the stage insure that the stage does not tip about an axis extending between the two ball-screw sprockets 462 and 464. The upper stage 32 is then set at the appropriate height in the same manner. The movable stages 32 and 34 together with the readily changeable lenses provide a wide range of reduction capabilities over a large field without distorting the images by more than the basic tolerance of about 1.5 micro inches. The bellows 40 can then be lowered by operating motor 509 until the sleeves 505 and 507 are lowered into the respective lens barrels.

The master transparencies are loaded into the plate carriers 120 for the upper stage 32. Each master transparency is a square plate of high resolution glass with two adjacent reference sides disposed at right angles. The image to be projected is in the form of opaque and transparent areas formed by developing photosensitive material coating one face of the glass plate. The master transparencies are inserted in the respective compartments of the plate carriers 120 with the face upon which the transparency is formed face down against the positioning studs 136, and with the reference edges biased against the banking lugs 138, 140 and 146 by the spring loaded member 154. When the lid plate 126 is closed, the leaf springs 160 securely hold each of the plates in the respective compartments with the face of the plate carrying the pattern oriented precisely parallel to the reference surfaces 176 on the bottom of the base plate 122, and with the reference edges of each plate parallel to the banking surfaces 170, 172 and 174 on the side wall of the base plate.

Each of the carriers 120 containing the master transparencies may then be inserted in the upper stage 32 by rotating levers 414 and 416 such that rails 418 and 420 are raised. The carrier 120 can then be inserted face down by sliding the reference surfaces 176 over the rails 418 and 420 until the banking surfaces 170, 172 and 174 engage the banking lugs 391, 390 and 392, respectively. The spring biased levers 394 may then be moved into position to bias the carrier against the banking lugs while the levers 414 and 416 are pivoted to lower the reference surfaces 176 onto the upwardly projecting stops 395. Each of the master plates will then be oriented precisely at the appropriate point along the respective optical axes, will be oriented precisely normal to the respective optical axes, and will be oriented precisely in the appropriate rotational position relative to the respective optical axes.

The photosensitive plates which are to be exposed are identical to the plates upon which the master transparencies are made. In fact, as will presently be described, intermediate sized master transparencies can be made with the step composition camera 10 to greatly reduce the total number of exposures required to make a final photomask. The photosensitive plates are loaded in the carriers 120 in the same manner as described above. Then the carriers may be inserted in the table 26 with the reference surfaces 176 facing upwardly by pivoting levers 262 so as to lower stools 248 and 250 below rails 208 and 210. Then the carriers 120 may be slid over rails 208 and 210 until the banking surfaces 170, 172 and 174 engage banking lugs 212, 214 and 220. Then the spring biased lever 224 may be pivoted into position to bias the carrier against the banking lugs while levers 262 are pivoted to raise stools 248 and 250 and lift the reference surfaces 176 on the carrier against the reference stops 206. Then the photosensitive material on the surface of each of the plates will be positioned precisely at the appropriate point on the respective optical axis and oriented precisely at a right angle to the axis and precisely in the appropriate rotational position about the axis.

A typical photomask produced by the camera 10 is shown in FIG. 33 where each of the rectangular patterns represents the image projected from the master transparency. However, the master transparency will normally be from five to twenty times as large as the image on the final photomask. In the basic operation of the step and repeat camera, the table 26 is positioned so that the image projected along the optical axis will strike the film plate at one of the exposure positions shown. The film plate is then exposed and the table 26 stepped to the next exposure position and the next exposure made. This procedure is repeated until all of the exposures for the photomask are made. For a photomask having a large area, i.e., three inches square, and small images, as many as 10,000 exposures may be required. Even though the table can be stepped and exposure completed in about two seconds, it will be appreciated that the production of such a mask would take over five hours of continuous operation.

The total number of exposures, and hence the total time required by the camera can be greatly reduced, however, because of the fact that the plates used for the master transparencies carried by the upper stage 32 and the photosensitive plates carried by the table 26 are of the same size and are positioned by the same system in both the table 26 and the stage 32. For example, assume that the final mask is to consist of an array of basic master patterns 100×100 or 10,000 separate patterns. Also, assume that the basic master pattern is to be reduced in size by a factor of sixteen. The lens carried by the lower stage 34 would then be selected and the upper and lower stages 32 and 34 would be set to provide a reduction equal to the square root of sixteen, or a reduction of four. The basic pattern would then be stepped over the photographic plates carried by table 26 so as to produce an intermediate master having an array exposure 10×10. Then the photographic plates carried by the table 26 would be removed and developed to provide intermediate master transparencies which are then inserted in the upper stage 32. The same step and expose routine is then repeated using a reduction of four and stepping the camera through the same 10×10 array of exposure.

The final product would then be an array of 100×100 exposures with a reduction of sixteen. However, only two hundred individual exposures would be required, as compared with 10,000, thus reducing the typical exposure time from more than five hours to less than ten minutes. It is important to note that reduction values could be any desired value so long as the product of the values is sixteen, and the number of exposures in the intermediate master might be an array 20×20 or 5×5 and the final exposures from the intermediate master be made in an array 5×5 or 20×20, if desired. The square root values provide the least number of total exposures, however.

As previously mentioned, it is important that the entire camera 10 be maintained at a constant temperature. Otherwise, expansions or contractions of the various components of the camera would case dislocations of the master transparencies, the lenses, and the photographic plates greater than the acceptable tolerances. This problem is minimized by making the castings for the table 26, the upper stage 32, and the lower stage 34 as similar as possible so that expansions and contractions will tend to be the same. However, it is important to maintain the temperature of the room in which the camera is located as nearly constant as possible, preferably within 0.1° F. of a selected value. The various castings should also be designed to minimize elongation and contraction due to vibrations.

Referring once again to FIG. 33, the table 26 is moved to the successive exposure positions by the computer operating under the program heretofore described in detail. It is convenient to discuss the movement of the table in terms of the X and Y coordinate directions of the final array of exposures. However, it will be appreciated that the table 26 actually moves in the opposite direction. The table is first moved into the positive quadrant defined by limit switches $X_L$ and $Y_L$ if the table is not already in that quadrant. This is achieved by moving the table first in the positive X direction, and then in the positive Y direction until both limit swictches $X_L$ and $Y_L$ are off. Then the table is moved simultaneously in the negative X and negative Y directions until limit switches $X_L$ and $Y_L$ are off. Then the table is moved simultaneously in the negative X and negative Y directions until limit switches $X_L$ and $Y_L$ are again turned on. As soon as $X_L$ is turned on, the X drive motor is set to zero, and as soon as $Y_L$ is turned on, the Y drive motor is set to zero so that the table stops in the vicinity of the origin $X_0$ and $Y_0$. The brakes are then set so that the operator can load the carriers 120 into the camera 10.

When the program is resumed, the drive motor brakes are released, and the table is moved very slowly in the X direction until it crosses $X_0$ at which time an interrupt signal is generated. The interrupt signal causes the computer to reset the most significant twenty-one bits of the interferometer fringe counter, and to read and store the least significant three bits. Then the X drive motor is set to zero. The table is then moved slowly in the Y direction until it crosses axis $Y_0$ at which time an interrupt signal is sent to the computer which resets the most significant twenty-one bits of the Y axis fringe counter, and reads and stores the count in the least significant three bits.

Next the computer operates the X and Y drive motors so as to continually position the table at the origin $(X_0, Y_0)$ to make the first exposure at the origin. Next the computer reads the barometric pressure and computes the distance, in terms of X and Y fringe counts, to the first exposure at XTAL=1 and YTAL=1. The computer then operates the X and Y drive motors so as to first accelerate the table in the X direction with the maximum design force to the maximum design velocity. Once the table has reached the design velocity, the X drive motor is set to zero. As the table continues to travel, the computer periodically measures the velocity of the table and operates the X drive motor to produce a series of impulses acting in either the positive or negative X direction in order to maintain the design velocity within a specified tolerance. When the table arrives at a point spaced a predetermined distance from the first exposure, an interrupt signal is generated which causes the computer to compute, based upon the velocity of the table, the point at which the drive motor should be set to the maximum design force in order to stop the table at the first exposure. Then when the table reaches the point at which the retard force is to be applied, another interrupt signal is generated which causes the computer to set the X drive motor to the retard force until the velocity of the table has been reduced to a predetermined minimum. Then the X drive motor is set to zero. The same procedure is then repeated with the Y axis drive motor to move the table to the Y coordinate of the first exposure.

As soon as the table is positioned in the vicinity of the first exposure, the computer then begins to cycle through a positioning routine of detecting the position of the table in the X and Y directions by reading the fringe counters, comparing the X and Y positions with the exposure position to obtain an error value, and operating the X and Y drive motors in a manner to move the table back toward the correct exposure position. The computer keeps a record of the times the table is within predetermined tolerance limits and after the table has been in tolerance a predetermined number of times, the exposure lamps are automatically turned on to start the exposure the duration of which is controlled by a mechanical timer. The positioning routine is continued during the exposure and a count is kept of the total number of times the positional error is measured and the number of times the table is out of tolerance.

Movement between exposure positions typically takes only a fraction of a second, while the exposure period may be as long as one or two seconds. If a high intensity source is used, however, the exposure may be of such a short duration that the table is not actually orbited at the exposure position during exposure, but merely passes by XAIM and YAIM at which time the light source is triggered. The table is then stepped across the first row, back the second row, and across the third row, etc., until all exposures are made. However, exposures are not made at the four blank exceptions. After the exposures are made, the table returns to the origin $X_0$ and $Y_0$ and makes a second home exposure. The offset between the first and second home exposures then provides a measure of the cumulative error for the run.

The system then goes into standby while the operator removes the carriers 120 in the upper stage 32 and inserts carriers 120 containing master transparencies for the reference marks which are to be exposed at the four exceptions. Then the computer is again initialized to reset the counters at $X_0$ and $Y_0$, and the table moved in the same manner to successively expose the reference marks at the first, second, third, and fourth exceptions before returning to home.

Although preferred embodiments of the invention have been described in detail, it is to be understood that various changes, substitutions and alterations can be made therein without departing from the spirit and scope of the invention as defined by the appended claims.

What is claimed is:
1. The step and repeat camera which comprises:
   a table for supporting a photographic plate aligned generally with each of a plurality of vertically disposed optical axes,
   a level support surface,
   a plurality of constant pressure air bearings connected to the table and traveling over the level support surface,
   projection means for projecting an image along each of the optical axes,
   drive means for moving the table in the X and Y coordinate directions,
   interferometer and counter means for measuring the movement of the table in the X and Y coordinate directions by maintaining a count of intereference fringe lines produced by movement of the table in each of the coordinate directions, and
   control means coupled to the counter means and the drive means for controlling the drive means, the control means including a computer programmed to operate the drive means to move the table to a reference position, compute the number of fringe counts in each of the X and Y coordinate directions from the reference position to a selected coordinate position, operate the drive system to move the table to the selected coordinate position, and operate the drive system to maintain the table in the selected coordinate position within established tolerances during a period of time necessary to expose the photographic plates with the respective images.

2. The step and repeat camera defined in claim 1 wherein the drive means for moving the table in the X and Y coordinate directions comprises:
   a first guide rail anchored to said support surface and extending in one of the coordinate directions,
   an intermediate stage supported by air bearings on said support surface and carrying a second guide rail extending in said other coordinate direction,
   guide means on the intermediate stage for slidably engaging the first guide rail to restrict movement of the intermediate stage to said one coordinate direction,
   guide means connected to the table for engaging the second guide rail and restricting movement of the table relative to the intermediate stage to said other coordinate direction, and wherein the drive means comprises:
      first drive means intercoupling the first guide rail and the intermediate stage for propelling the intermediate stage along the first guide rail, and
      second drive means intercoupling the intermediate stage and the table for propelling the table along the second guide rail.

3. The step and repeat camera defined in claim 2 wherein:
   each of the guide rails has a planar guide surface, and
   each of the guide means comprises a plurality of air bearings riding on the planar guide surface and means for biasing the air bearings against the planar guide surface.

4. The step and repeat camera defined in claim 3 wherein:
   each of the drive means includes a drive rail and a printed circuit motor having a drive wheel engaging the drive rail, the motor being mounted on one of the members and the drive rail being mounted on the other.

5. The step and repeat camera which comprises:
   means for projecting an image downwardly along an optical axis,
   a table for supporting a photographic plate aligned generally with the optical axis,
   a level support surface,
   a plurality of air bearings connected to the table and traveling over the level support surface for supporting the table, and
   drive means for moving the table in X and Y coordinate directions, said drive means for moving the table in the X and Y coordinate directions comprising:
      a first guide rail anchored to said support surface and extending in one of the coordinate directions,
      an intermediate stage supported by air bearings on said support surface and carrying a second guide rail extending in said other coordinate direction,
      guide means on the intermediate stage for slidably engaging the first guide rail to restrict movement of the intermediate stage to said one coordinate direction,
      guide means connected to the table for engaging the second guide rail and restricting movement of the table relative to the intermediate stage to said other coordinate direction, and wherein the drive means comprises:
         first drive means intercoupling the first guide rail and the intermediate stage for propelling the intermediate stage along the first guide rail, and
         second drive means intercoupling the intermediate stage and the table for propelling the table along the second guide rail.

6. The step and repeat camera defined in claim 5 wherein:
   each of the guide rails has a planar guide surface, and
   each of the guide means comprises a plurality of air bearings riding on the planar guide surface and means for biasing the air bearings against the planar guide surface.

7. The step and repeat camera defined in claim 5 wherein:
   each of the drive means includes a drive rail and a printed circuit motor having a drive wheel engaging the drive rail, the motor being mounted on one of the members and the drive rail being mounted on the other.

8. In a system for controlling the movement of a member along an axis, the combination of:
   a support surface,
   a plurality of air bearings traveling over the support surface and connected to support the member,
   drive means for moving the member along the axis,
   interferometer and counter means for continually indicating the current position of the member relative to the axis in fringe counts, and
   a digital computer for continually calculating the force required by the drive means to move the table from the current position to a desired position, the computer being interfaced to operate the drive means at the calculated force.

9. The step and repeat camera which comprises:
   means for projecting an image downwardly along an optical axis,
   a table for supporting a photographic plate aligned generally with the optical axis,
   a level support surface,
   a plurality of air bearings connected to the table and traveling over the level support surface for supporting the table, and
   drive means for moving the table in X and Y coordinate directions, the drive means continuously controlled in real time by a system including an interferometer and counter means for continually indicating the current position of the table in fringe counts, and a digital computer for continually calculating the force required by the drive means to move the table from the current position to a desired position, the computer being interfaced to operate the drive means at the calculated force.

References Cited

UNITED STATES PATENTS 3,052,174   9/1962   Berger _____ 355—95

JOHN M. HORAN, Primary Examiner

R. A. WINTERCORN, Assistant Examiner

U.S. Cl. X.R.

95—4.5; 355—86, 95; 356—106, 110